United States Patent
Bidkar et al.

(10) Patent No.: US 12,486,778 B2
(45) Date of Patent: Dec. 2, 2025

(54) SEAL MONITORING APPARATUS

(71) Applicant: General Electric Company, Schenectady, NY (US)

(72) Inventors: Rahul Anil Bidkar, Clifton Park, NY (US); Deepak Trivedi, Halfmoon, NY (US); Bugra H. Ertas, Niskayuna, NY (US); Pei-Hsin Kuo, Alplaus, NY (US); Joseph Herbert Fields, Fort Thomas, KY (US); Andrew Kevin Winn, Niskayuna, NY (US); Eric R. Westervelt, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 270 days.

(21) Appl. No.: 17/972,883

(22) Filed: Oct. 25, 2022

(65) Prior Publication Data

US 2024/0133309 A1 Apr. 25, 2024
US 2024/0229666 A9 Jul. 11, 2024

(51) Int. Cl.
 *F01D 11/00* (2006.01)
 *F01D 21/00* (2006.01)

(52) U.S. Cl.
 CPC .......... *F01D 11/003* (2013.01); *F01D 21/003* (2013.01); *F05D 2260/80* (2013.01)

(58) Field of Classification Search
 CPC ... F01D 11/003; F01D 21/003; F05D 2260/80
 See application file for complete search history.

(56) References Cited

U.S. PATENT DOCUMENTS

| | | | |
|---|---|---|---|
| 5,685,158 | A | 11/1997 | Lenahan |
| 5,961,279 | A | 10/1999 | Ingistov |
| 6,799,112 | B1 | 9/2004 | Carter |
| 7,094,020 | B2 | 8/2006 | Dong |
| 10,082,041 | B2 | 9/2018 | Bei |

(Continued)

FOREIGN PATENT DOCUMENTS

| | | |
|---|---|---|
| EP | 1416124 | 5/2004 |
| WO | 2013066529 A1 | 5/2013 |

(Continued)

OTHER PUBLICATIONS

USPTO; U.S. Appl. No. 17/972,834; Notice of Allowance and Fees Due (PTOL-85) mailed Aug. 20, 2024; (pp. 1-5).

(Continued)

*Primary Examiner* — Abby J Flynn
*Assistant Examiner* — Clint Pham
(74) *Attorney, Agent, or Firm* — Hanley, Flight & Zimmerman, LLC

(57) ABSTRACT

A seal monitoring apparatus is provided. The seal monitoring apparatus includes a temperature sensor and a controller in communication with the temperature sensor. The temperature sensor is mounted at a seal of a device. The controller is configured to receive measured temperature data from the temperature sensor and calculate expected temperature data for the seal based at least in part on operating conditions of the device. The controller is configured to determine a condition of the seal based at least in part on a temperature difference of the measured temperature data from the expected temperature data.

17 Claims, 9 Drawing Sheets

(56) References Cited

U.S. PATENT DOCUMENTS

| | | |
|---|---|---|
| 10,458,267 B2 | 10/2019 | Gibson |
| 10,487,679 B2 | 11/2019 | Bagdonis |
| 10,626,741 B2 | 4/2020 | Miller |
| 11,203,815 B2 | 12/2021 | Detor |
| 11,209,086 B2 | 12/2021 | Davis |
| 11,231,340 B2 | 1/2022 | Li |
| 11,243,134 B2 | 2/2022 | Schulte |
| 12,259,292 B2 | 3/2025 | Ertas |
| 2003/0074957 A1* | 4/2003 | Lemecha ............ G02B 6/43 73/114.13 |
| 2008/0008574 A1* | 1/2008 | Brillert ............. F04D 29/164 415/1 |
| 2015/0211379 A1* | 7/2015 | Doumecq-Lacoste ................ G01M 3/00 415/118 |
| 2017/0219152 A1* | 8/2017 | Petrou ............... F16L 27/087 |
| 2018/0066585 A1* | 3/2018 | Lambert ............ F04D 29/444 |
| 2020/0001832 A1* | 1/2020 | Deane ................ B08B 3/02 |
| 2020/0003205 A1 | 1/2020 | Stokkevåg |
| 2020/0066061 A1* | 2/2020 | Tran .................... F02C 7/00 |
| 2021/0325359 A1 | 10/2021 | Brillon |
| 2021/0325362 A1 | 10/2021 | Brillon |
| 2022/0154649 A1* | 5/2022 | Unton .................. F02C 7/28 |
| 2023/0312128 A1* | 10/2023 | Schenk ............ B64D 41/007 244/58 |
| 2024/0133770 A1 | 4/2024 | Ertas |
| 2024/0230470 A9 | 7/2024 | Ertas |

FOREIGN PATENT DOCUMENTS

| | | |
|---|---|---|
| WO | 2014093286 | 6/2014 |
| WO | 2015113250 | 8/2015 |

OTHER PUBLICATIONS

USPTO; U.S. Appl. No. 17/972,834; Non-Final Rejection mailed May 21, 2024; (pp. 1-9).

USPTO; U.S. Appl. No. 17/972,834; Notice of Allowance and Fees Due (PTOL-85) mailed Nov. 12, 2024; (pp. 1-5).

* cited by examiner

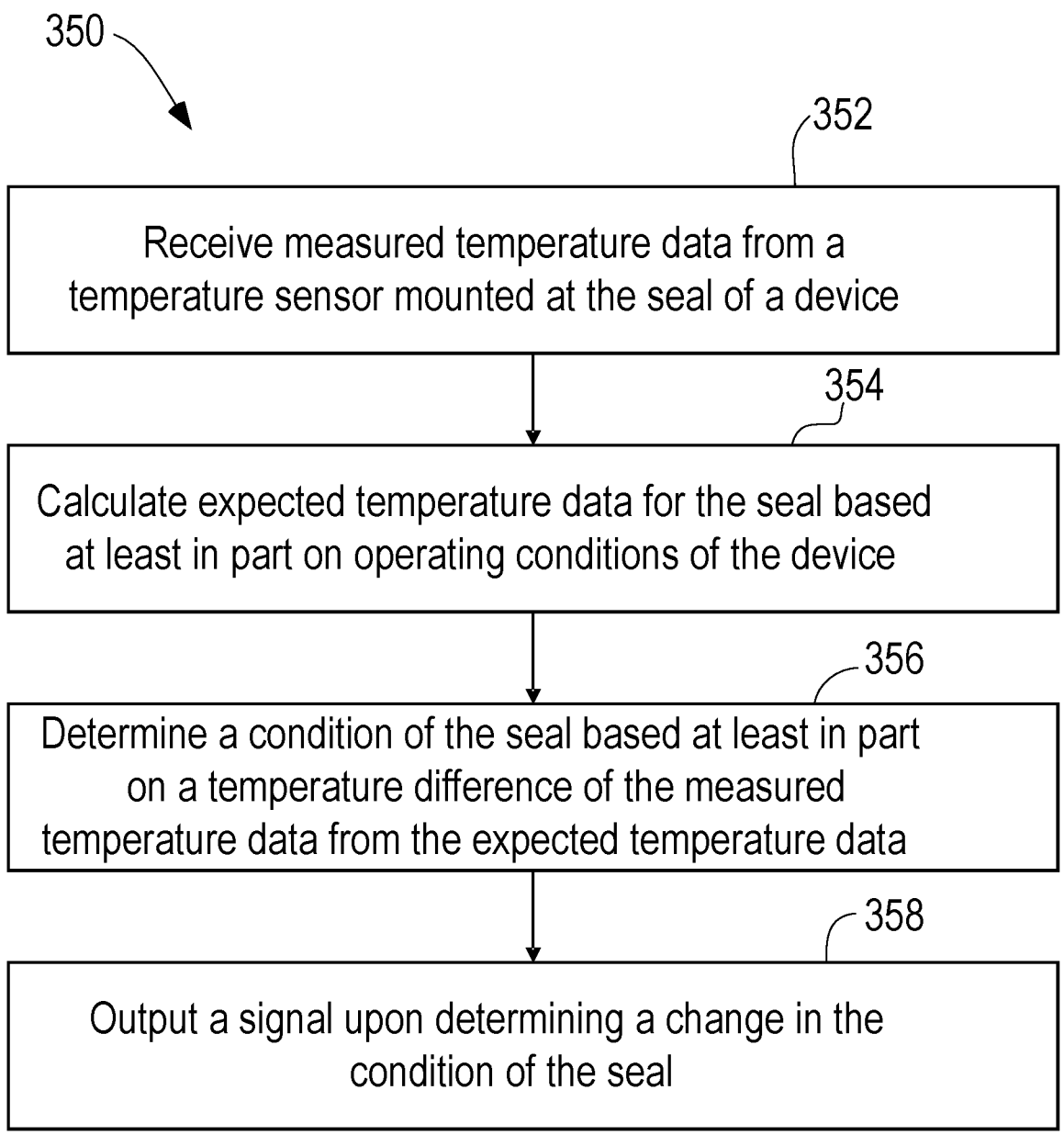

SEAL MONITORING APPARATUS

CROSS-REFERENCE TO RELATED APPLICATION

The related application titled "SEAL MONITORING APPARATUS" filed concurrently herewith on Oct. 25, 2022, as U.S. application Ser. No. 17/972,834, is incorporated herein by reference in its entirety.

TECHNICAL FIELD

The disclosed subject matter relates generally to monitoring systems and, more particularly, to component monitoring systems for engines.

BACKGROUND

Seals impede the flow of fluid from one side of the seal to the other side of the seal. Seals may be static seals or dynamic seals. Static seals are positioned between two surfaces that are stationary relative to one another. Dynamic seals are positioned between two surfaces that move relative to one another. Some dynamic seals are contact seals that physically contact the two surfaces. Some dynamic seals are clearance seals where there is a gap between the stationary part of the seal and the rotating part of the seal. Seals are subject to wear, and monitoring of such wear is desired.

BRIEF DESCRIPTION OF THE DRAWINGS

Various needs are at least partially met through provision of the seal monitoring apparatus described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 5 is a flow diagram for monitoring the seal using the seal monitoring apparatus of FIG. 3;

Figure 1:
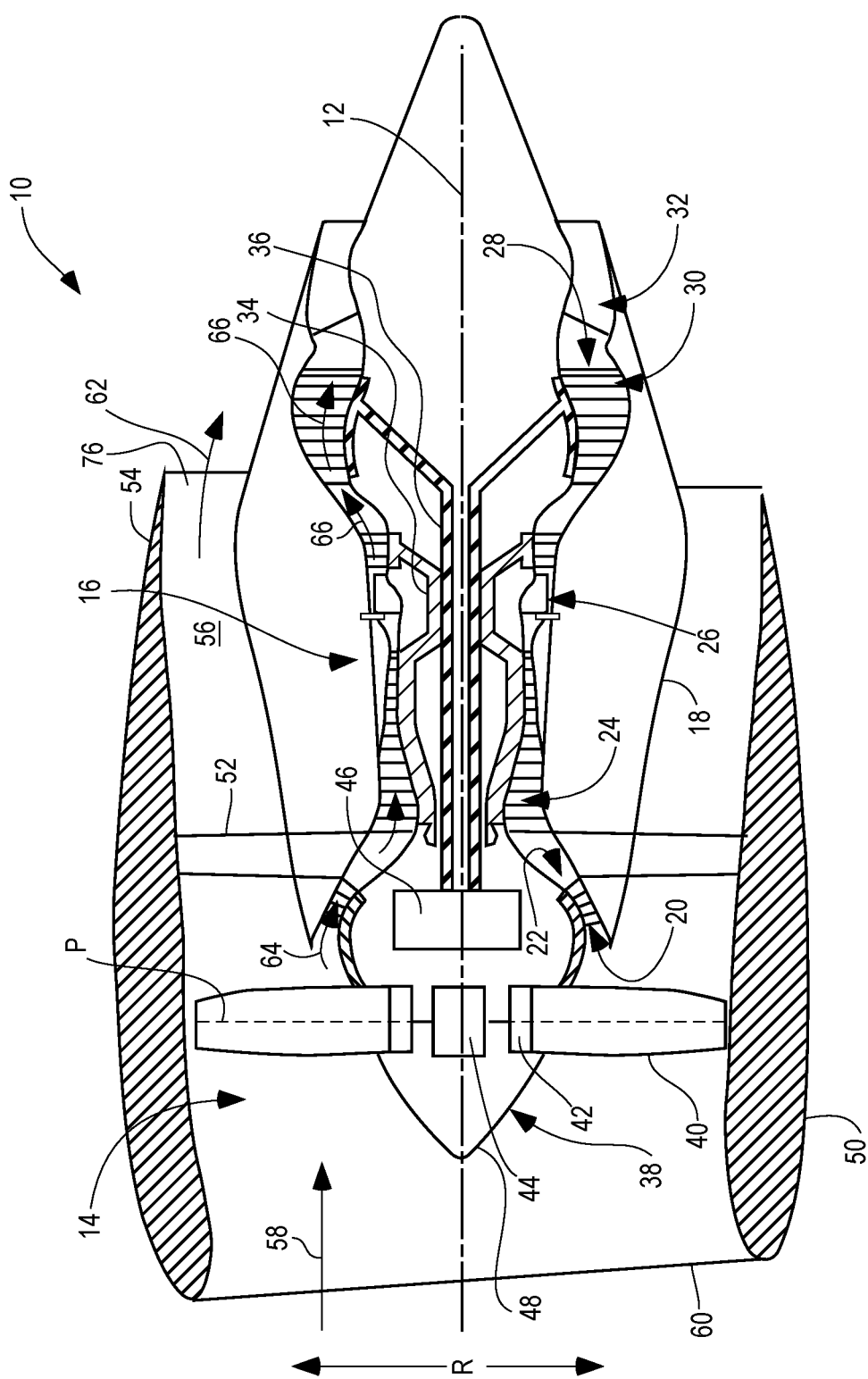
FIG. 1 is a cross-sectional view of a gas turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/ or steps may be described or depicted in a particular order of occurrence while those skilled in the art will understand that such specificity with respect to sequence is not actually required.

DETAILED DESCRIPTION

Gas turbine engines include a plurality of seals including, for example, a bearing sump seal. In some instances, the bearing sump seal is a carbon seal with a stationary (non-rotating) carbon ring and a rotating mating ring. The non-rotating carbon ring and the rotating mating ring form a clearance seal when the rotor of the gas turbine engine rotates. The seals of the gas turbine engine wear over time and are to be replaced before they fail. Regarding the bearing sump seal, under normal operation, the bearing sump seal, such as a carbon ring, forms a clearance seal with a sealing surface, such as a mating ring, that rotates with a rotor of the gas turbine engine as the rotor spins. For example, the bearing sump seal may form about a 0.0003 to 0.001 inch air film seal with the sealing surface as the rotor spins. From time to time, the bearing sump seal may contact or rub against the sealing surface as the rotor spins causing the bearing sump seal to wear more quickly than when operating normally with an air film. In some instances where the bearing sump seal is a carbon ring, the carbon ring may fail due to excessive rubbing loads causing a brittle graphite carbon matrix of the carbon ring to crack. Currently, it is difficult to ascertain the health and/or remaining useful life of a seal.

In general, the present subject matter relates to a seal monitoring apparatus and a method of monitoring a seal. The seal monitoring apparatus may be used for determining a current operational condition of the seal and for determining when to service the seal. Where the seal is determined to have failed, action may be taken to mitigate risks and inhibit collateral damage resulting from the failure of the seal. The seal monitoring apparatus may estimate the remaining useful life of the seal and output an alert when the seal should be serviced. Determining when to service the seal is beneficial because the seal is able to be replaced prior to the seal reaching a failure condition while reducing unnecessary replacement of seals that have not reached the ends of their useful life. As described in further detail herein, the seal monitoring apparatus uses physics-based models for determining the operational condition of the seal and for estimating the remaining useful life of the seal to plan for maintenance of the seal.

In some embodiments, the seal monitoring apparatus includes a temperature sensor in communication with a controller. The temperature sensor is mounted at a seal of a device. The controller is configured to receive measured temperature data from the temperature sensor and calculate expected temperature data for the seal based at least in part on operating conditions of the device. The controller is configured to determine a condition of the seal based at least in part on a temperature difference of the measured temperature data from the expected temperature data.

In some embodiments, the seal is a carbon seal. In some embodiments, the temperature sensor is embedded in the seal. In some embodiments, the seal is a film riding seal configured to separate from an opposing sealing to create an air film therebetween. While the following discussion primarily relates to monitoring of carbon seals, the seal monitoring apparatus may similarly be used to monitor the condition of other types of dynamic seals, for example, rotor-stator seals and reciprocating seals. Rotor-stator seals may include film riding hydrostatic and hydrodynamic seals such as, for example, mechanical face seals, radial lip seals, and brush seals. Reciprocating seals may include, as examples, piston seals, rod seals, and wiper seals. The temperature sensor may be positioned at the seal and/or embedded in the seal to monitor the temperature of the seal.

In some embodiments, the controller may calculate the expected temperature data by inputting the operating conditions of the device into a model of the seal configured to output the expected temperature data based on the input operating conditions. In some embodiments, the device is an engine and the operating conditions include one or more of an engine speed, a temperature on at least one of a first side and a second side of the seal, a pressure on at least one of the first side and the second side of the seal.

In some embodiments, the controller determines the condition of the seal by estimating a wear rate of the seal based on the temperature difference. Estimating the wear rate of the seal may include referencing one or more datasets of the seal correlating the temperature difference to the wear rate. The one or more datasets may be one or more graphs, equations, lookup tables that are generated based on experimentally collected data correlating the temperature difference to a wear rate.

In some embodiments, to determine the condition of the seal the controller estimates one or more wear rates of the seal based on the temperature difference over time and determines a cumulative wear of the seal over time based at least in part on a time the seal is at each of the one or more wear rates. In some embodiments, to determine the condition of the seal, the controller estimates a remaining life expectancy of the seal. In some embodiments, the controller detects seal failure and/or impending seal failure when the temperature difference exceeds a threshold value (e.g., 100° F.). The controller may output a signal upon determining a change in the condition of the seal. The signal may indicate the seal is in a failure condition and/or to service the seal.

The foregoing and other benefits may become clearer upon making a thorough review and study of the following detailed description.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Film riding seals have aerodynamic features that create an air film between a seal ring and an associated sealing surface when the seal ring and seal surface are moved relative to one another. Carbon seals are one example of film riding seals that have such aerodynamic features that create an air film between a carbon ring and an associated mating ring when the carbon ring and mating ring are move relative to one another. In many applications, the film riding seals may not separate as intended, resulting in the seal ring (e.g., carbon ring) rubbing against the sealing surface (e.g., mating ring), causing the seal to wear more quickly than when operating as intended with an air film. As a result of the seal ring rubbing against the sealing surface, the film riding seals may reach the end of the useful life and/or fail more quickly than expected.

The present disclosure provides a seal monitoring apparatus and related methods for monitoring when the seal ring of a device (e.g., a turbofan engine) is rubbing against the sealing surface and estimating the remaining useful life of the seal accounting for the resulting wear due to the rubbing. The seal monitoring apparatus includes one or more temperature sensors at or embedded in the stationary carbon seal of a bearing sump of a turbofan engine. The seal monitoring apparatus may include a pressure sensor in the upstream, high-pressure cavity adjacent the seal. A controller of the seal monitoring apparatus receives the temperature and pressure data from the temperature and pressure sensors. The controller may be the Full Authority Digital Engine Control (FADEC) and/or another processing unit located on or off of the engine and/or on or off an aircraft associated with the engine. The controller may receive the temperature data of the seal (steady state and transient) collected by the temperature sensor and compare it with predicted or expected seal temperature data determined based on the current operating conditions of the device (e.g., N1, N2, T2, P3, WFM explained further herein). The controller of the seal monitoring apparatus may determine the health or remaining useful life of the seal and/or determine when the seal has failed or when failure is imminent based on the deviation of the measured temperature data from the expected temperature data.

The temperature and/or pressure sensors of the seal monitoring apparatus may include wires extending from the sensors to the controller of the seal monitoring apparatus. Where the seal is the seal of a turbofan engine, the wires may be routed through an internal cavity of a stator vane of the turbofan engine, for example, a stator vane of a low-pressure compressor, high-pressure compressor, low-pressure turbine, and/or high-pressure turbine. The wires of the sensors may be routed through an existing pipe extending through the seal stator. In some forms, the wires of the sensors may be routed through a multi-lumen pipe having a first lumen for the wires so as not to obstruct a channel of a second lumen of the multi-lumen pipe. The multi-lumen pipe may be fabricated by electroforming. The wires may extend through interfaces of the turbofan engine so that the seal monitoring apparatus may be assembled and disassembled from the turbofan engine without significant additional effort.

The seal monitoring apparatus may also include a chemical sensor mounted in the upstream, high-pressure cavity outside of the bearing sump. The controller may receive data from the chemical sensor to detect oil leakage outside of the seal. The controller may determine that the seal has failed upon detecting oil or more than a threshold amount of oil outside of the bearing sump.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The tubular outer casing 18 encases, in serial flow relationship, a compressor section including a low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) spool 36 drivingly connects the LP turbine 30 to the LP compressor 22.

The fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low pressure spool 36 across a power gearbox 46. The power gearbox 46 includes a plurality of gears for stepping down the rotational speed of the LP spool 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion 62 of the air 58 as indicated by arrow is directed or routed into the bypass airflow passage 56 and a second portion 64 of the air 58 as indicated by arrow is directed or routed into the LP compressor 22. The ratio between the first portion 62 of air 58 and the second portion 64 of air 58 is commonly known as a bypass ratio. The pressure of the second portion 64 of air 58 is then increased as it is routed through the HP compressor 24 and into the combustion section 26, where it is mixed with fuel and burned to provide combustion gases 66. Subsequently, the combustion gases 66 are routed through the hot flowpath, or hot-section flowpath, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, a land-based gas turbine, a land-based steam turbine or a land-based turbine with working fluid such as hydrogen, supercritical carbon dioxide etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
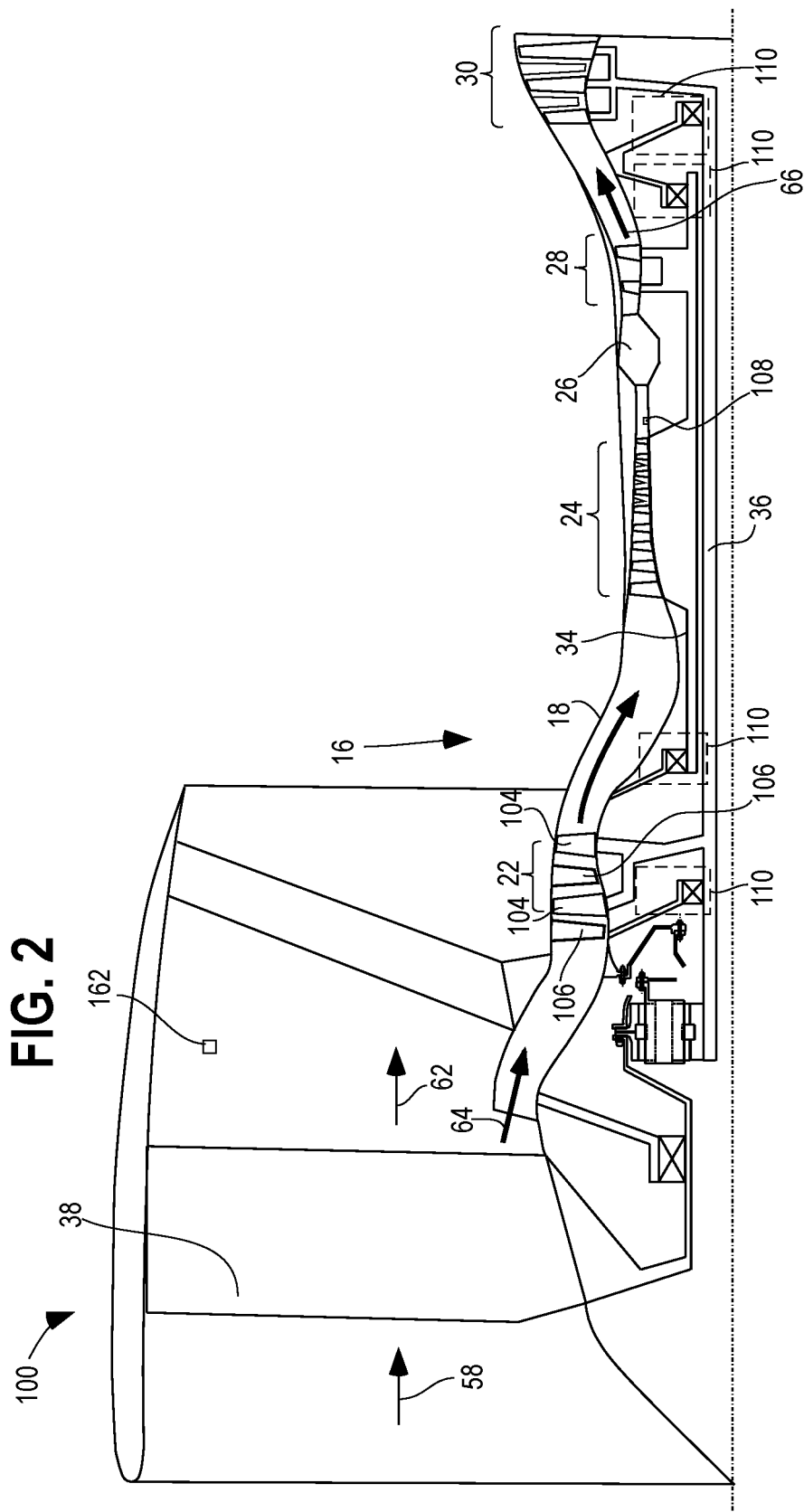
FIG. 2 is a cross-sectional view of a portion of a gas turbine engine similar to the gas turbine engine of FIG. 1.

With reference to FIG. 2, a cross-sectional view of a portion of a turbofan engine 100 is provided. The turbofan engine 100 of FIG. 2 is similar in many respects to the turbofan engine 10 of FIG. 1 such that similar features of the turbofan engine 10 described above are referenced in FIG. 2 using the same reference numerals. The turbofan engine 100 includes the core turbine engine 16 having the substantially tubular outer casing 18 defining a core flow path. The second portion 64 of air 58 is routed along the core flow path to the low-pressure compressor 22, the high-pressure compressor 24, the high-pressure turbine 28, and the low-pressure turbine 30 which each include rotating components that are provided with some form of lubrication oil. For example, the turbofan engine 100 includes one or more bearing sumps 110 that collect lubrication oil to provide to bearings that support the low-pressure turbine spool 36 or high-pressure turbine spool 34 that are rotated by the turbines 28 and 30 and drive the compressors 22 and 24. Bearing sump seals, such as seal 124 discussed below, inhibit the lubrication oil or oil mist from flowing out of the bearing sumps 110, for example, into the core flow path of the core turbine engine 16. Failure of the bearing sump seals may thus result in lubrication oil leaking into the core flow path and being carried through the core turbine engine 16 which may result in the lubrication oil being burned causing undesired smoke. Moreover, as the lubrication oil leaks from the bearing sump, the bearings supporting the spool 34, 36 may not be properly lubricated.

The present disclosure provides a seal monitoring apparatus for monitoring the condition of a bearing sump seal such that the seal may be serviced before the seal fails. For example, the seal monitoring apparatus 150 may determine a remaining useful life of the seal and output an alert signal indicating when the seal should be serviced. While the following discussion primarily relates to the seal monitoring apparatus being used to monitor the seal 124 at the low-pressure compressor 22, the seal monitoring apparatus 150 may similarly be used to monitor the other bearing sump seals or other carbon seals of the turbofan engine 100. The seal monitoring apparatus 150 may similarly be used to monitor carbon seals in gas turbines used in other applications as well such as, for example, power generation and oil and gas. The seal monitoring apparatus 150 may similarly be used to monitor carbon seals in steam turbines or other turbines using other types of working fluids such as hydrogen or supercritical carbon dioxide.

The low-pressure compressor 22 includes a rotor 102 of the low-pressure turbine spool 36 with a plurality of stages of compressor airfoils 104 spaced axially along the rotor 102. The compressor airfoils 104 are rotated relative to the tubular outer casing 18 with rotation of the low-pressure turbine spool 36 to direct air toward the combustion section 26. The low-pressure compressor 22 may include one or more sets of guide vanes 106 that extend from the tubular outer casing 18 before and/or after each stage of the compressor airfoils 104 to reduce the rotational motion of the air and to direct the air axially toward the combustion section 26. The guide vanes 106 may be, for example, stator vanes or variable guide vanes that are able to be rotated about their longitudinal axis to control the airflow through the low-pressure compressor 22. For example, the guide vane 106 before the first stage of the compressor airfoils 104 may be a variable inlet guide vane to regulate the airflow 64 into the low-pressure compressor to enhance turbine efficiency.

Figure 3:
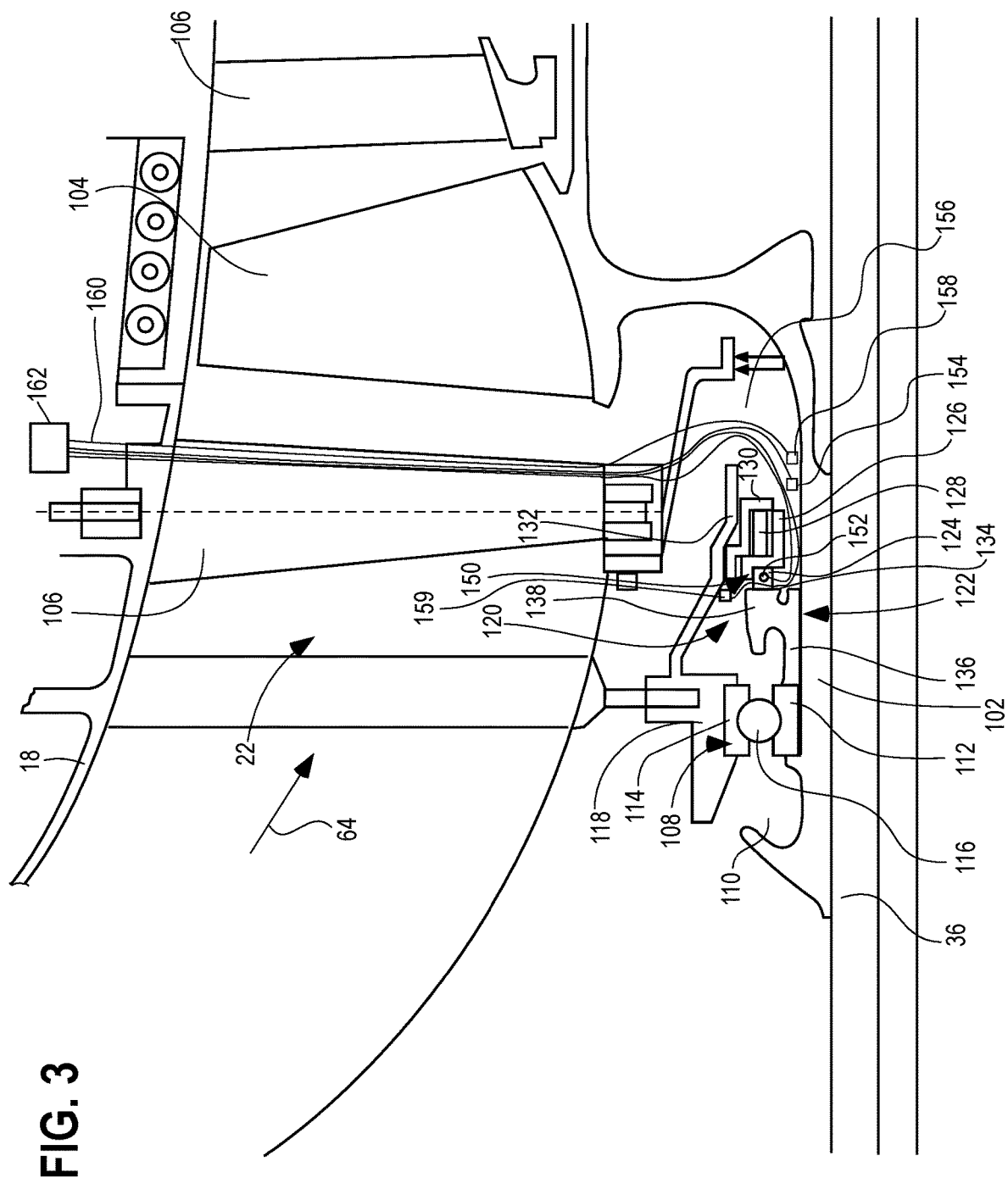
FIG. 3 is a detailed cross-sectional view of the gas turbine engine of FIG. 2 including a seal according to one embodiment and a seal monitoring apparatus.

With reference to FIG. 3, a detailed cross-sectional view of a section of the turbofan engine 100 at the low-pressure compressor 22 is shown. The compressor airfoil 104 may be rotated by the low-pressure turbine spool 36. The low-pressure turbine spool 36 may be supported by a bearing 108 in the bearing sump 110. The bearing 108 may include an inner race 112, an outer race 114, and a plurality of rolling elements, such as one or more balls 116 that travel along the inner and outer race 112, 114. The bearing 108 may have a bore or internal diameter sized to receive the rotor 102. The bearing 108 may have an outer diameter sized to be received within a support 118 extending from an internal wall defining the core flow path. The bearing 108 provides support to the rotor 102 while permitting the rotor 102 to rotate to move the compressor airfoils 104 within the tubular outer casing 18. A lubricating oil may be provided in the bearing sump 110 to lubricate the bearings 108.

The low-pressure compressor 22 further includes a seal system 120 according to one embodiment that retains the lubricating oil within the bearing sump 110 and inhibits the lubricating oil or oil mist from flowing out of the bearing sump 110 and into the core flow path through which the portion 64 of air flows. For example, it is desired to prevent the lubrication oil from reaching the combustion section 26 of the core turbine engine 16 where the lubricating oil could be burned which may result, for example, in undesired smoke.

The seal system 120 may include a carbon face seal having a seal mating ring 122, a seal 124, a carrier 126, a bellows spring 128, and a seal adaptor 130. The seal adaptor 130 has a radial outer surface configured to engage a support flange 132 of the turbofan engine 100. For example, the seal adaptor 130 may be press-fitted into the support flange 132 to form a fluid tight connection therebetween. The seal 124 may be a film riding seal that interacts with a sealing surface 134 of the seal mating ring 122 to form a fluid tight seal therebetween. The seal 124 may have a ring shape and may be rigidly coupled to the carrier 126. The seal 124 may be formed at least in part of carbon, for example, the seal 124 may be a carbon seal formed of graphite. The seal 124 engages the seal mating ring 122 that may include one or more grooves on the face of the mating ring 122. The grooves may form one or more shallow depressions on the mating ring sealing surface 134 that may contact the seal 124. The grooves may provide the sealing surface 134 with aerodynamic characteristics that cause the seal 124 to separate from the sealing surface 134 of the seal mating ring 122 as the seal mating ring 122 is rotated as described in further detail below.

The seal mating ring 122 may have a cylindrical portion 136 having an inner diameter sized to receive the rotor 102. The seal mating ring 122 has a sealing flange 138 extending radially outward from the cylindrical portion 136 that includes the sealing surface 134. The cylindrical portion 136 extends axially along the rotor 102 and may abut the bearing 108 to set the location of the sealing surface 134 relative to the seal 124. The seal mating ring 122 is secured to the rotor 102 such that the seal mating ring 122 rotates with the rotor 102. The seal 124 may be biased towards the sealing surface 134 by the bellows spring 128 that extends between the seal adaptor 130 and the carrier 126. The bellows spring 128 may be formed of a metal material. The bellows spring 128 may further form a seal between the seal adaptor 130 and the carrier 126 to inhibit the lubrication oil from exiting the bearing sump 110. In other embodiments, the seal 124 is biased toward the sealing surface 134 by a wave spring. Where a wave spring is used, a secondary seal, such as a carbon seal or piston ring, may extend between the seal adaptor 130 and carrier 126 to inhibit lubrication oil from exiting the bearing sump 110.

When the rotor 102 is stationary or not rotating, the seal 124 may be biased against the sealing surface 134 by the bellows spring 128 or wave spring. During normal operation, as the rotor 102 rotates and exceeds a revolutions per minute (RPM) threshold, the seal 124 and the sealing surface 134 separate forming a gap therebetween. The separation of the seal 124 from the sealing surface 134 may be caused by the grooves of the sealing surface 134 of the mating ring 122 that act as a pump as the sealing surface 134 rotates thus creating an air film that the seal 124 rides on. The gap or air film between the seal 124 and the sealing surface 134 may be, for example, about 0.0003 to 0.001 inches and may vary with the speed of rotation of the sealing surface 134. The air film formed between the seal 124 and the sealing surface 134 inhibits fluid from passing therebetween. The seal 124 thus forms an air film seal with the sealing surface 134 during normal operation such that the seal 124 does not wear against the sealing surface 134 at certain rotation speeds (e.g., those above the RPM threshold).

In some situations, however, the seal 124 and the sealing surface 134 do not separate when intended and the seal 124 frictionally engages or rubs against the sealing surface 134. This rubbing of the seal 124 against the sealing surface 134 causes the seal 124 to wear and thus reduces the remaining useful life of the seal 124 more quickly than during normal operation where an air film is formed. A seal monitoring apparatus 150 may be used to monitor when the seal 124 is rubbing against the sealing surface 134 and to estimate the amount of wear on the seal 124 during such abnormal operation. The estimated amount of wear of the seal 124 may be used to predict the remaining useful life of the seal 124 so that action may be taken to service the seal 124 before the seal 124 fails and/or to take action upon determining that failure of the seal 124 is imminent or has occurred.

The seal monitoring apparatus 150 may include a temperature sensor 152 mounted at the seal 124. The temperature sensor 152 may be operable to measure temperature. The temperature sensor 152 may be positioned to monitor the temperature of the seal 124. In some embodiments, the temperature sensor(s) 152 is embedded within the seal 124. For example, the temperature sensor 152 is embedded within the graphite forming the seal 124. For instance, a blind hole may be machined in the carbon ring of the seal 124 and the temperature sensor 152 attached inside the hole. In some embodiments, the seal monitoring apparatus 150 includes more than one temperature sensor 152 mounted at the seal 124 to monitor the temperature of the seal 124 at various locations.

The seal monitoring apparatus 150 may include a pressure sensor 154 mounted in the high-pressure cavity 156 separated by the bearing sump 110 by the seal 124. The pressure sensor 154 may be operable to measure a pressure amplitude in the high-pressure cavity 156 and may be in communication with the controller 162 via the wires 160. The seal monitoring apparatus 150 may also include a chemical sensor 158 mounted in the upstream, high-pressure cavity outside of the bearing sump 110. The chemical sensor 158 may be operable to detect lubrication oil in the high-pressure cavity 156 and may be in communication with the controller 162 via the wires 160. The seal monitoring apparatus 150 may also include an oil viscosity sensor 159. The oil viscosity sensor 159 may be mounted in the low-pressure side of the seal and may be positioned to measure the viscosity of the oil adjacent to the seal system 120. An increase in the oil viscosity at the seal system 120 may indicate an increase in temperature of the oil, which may result as the temperature of the seal 124 increases. The oil viscosity sensor 159 may be in communication with the controller 162 via the wires 160. Alternatively, the oil viscosity sensor may be a sensor of the turbofan engine 100 (e.g., in the bearing sump 110) and the controller 162 may receive the oil viscosity data from the turbofan engine 100.

The seal monitoring apparatus 150 includes one or more wires 160 extending from the temperature sensor 152 and/or pressure sensor 154 to a controller 162 of the seal monitoring apparatus 150. The wires 160 may be routed through an internal cavity or channel of the guide vane 106. For example, the guide vane 106 may include an internal channel extending radially within the guide vane 106 that the wires 160 extend through from the temperature sensor 152 and/or pressure sensor 154 to the tubular outer casing 18. The wires 160 may extend through an opening in the tubular outer casing 18 and out of the core turbine engine 16 to the controller 162.

In some applications, a pipe extends through the guide vane 106 that permits air to flow into an internal cavity of the core turbine engine 16 from outside of the core turbine engine 16 and vice versa. The wires 160 may be routed through such an existing pipe from the controller 162 to the temperature sensor 152 and/or pressure sensor 154.

Figure 4A:
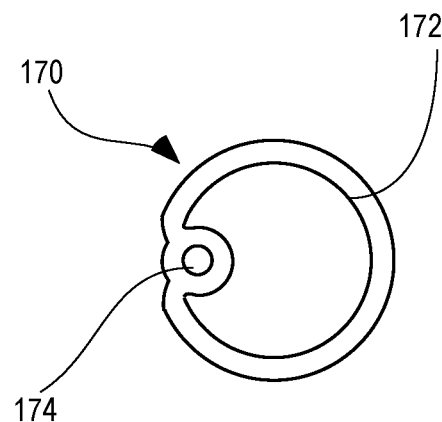
FIG. 4A is a cross-sectional view of a multi-lumen pipe for routing the seal monitoring apparatus through the gas turbine engine of FIG. 2.

With reference to FIGS. 4A, in some embodiments, the wires 160 may be routed through a multi-lumen conduit 170. The multi-lumen conduit 170 may extend through an internal channel of a guide vane 106 as described above. The multi-lumen conduit 170 may include a first lumen 172 and a second lumen 174. The first lumen 172 provides a channel through which air may flow into and out of the internal cavity of the core turbine engine 16. The second lumen 174 may provide a channel through which the wires 160 may be routed between the temperature sensor 152 and/or pressure sensor 154 and the controller 162. Providing the second lumen 174 for the wires 160 separate from the first lumen 172 ensures the flow of air through the first lumen 172 of the multi-lumen conduit 170 is not restricted, e.g., by the wires 160.

Figure 4B:
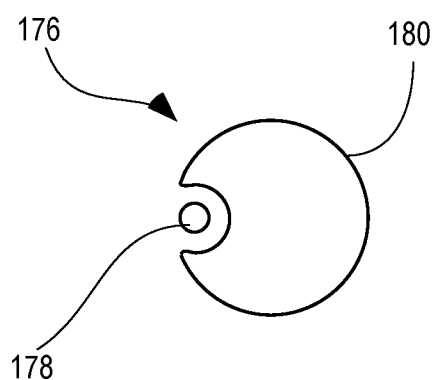
FIG. 4B is a cross-sectional view of a mandrel used to form the multi-lumen pipe of FIG. 4A.

The multi-lumen conduit 170 may be formed by an electroforming process. With respect to FIG. 4B, a cross-sectional view of a model or mandrel 176 for forming the multi-lumen conduit 170 is provided. The mandrel 176 may include a first cylindrical pipe portion 180 and a second cylindrical pipe portion 178 that is received within a recess extending along the length of the first cylindrical pipe portion 180. The mandrel 176 may be formed of a conductive material (e.g., metallic) or have a conductive layer that is treated with a parting layer or is chemically passivated to limit electroform adhesion to the mandrel to allow the mandrel to be separated from the formed multi-lumen conduit 170. The mandrel 176 may be placed in an electrolytic bath containing salts of the metal being electroformed. The mandrel 176 serves as the cathode on which the electroform metal of the electrolytic bath collect to form the anode. A direct current may be passed through the electrolytic bath to deposit the metal on the mandrel 176. The process may be continued until a desired thickness of the electroform metal has been deposited on the mandrel 176. Once the electroforming process is complete, the mandrel 176 may be separated from the anode forming the multi-lumen conduit 170 of FIG. 4A.

Returning to FIG. 3, the controller 162 of the seal monitoring apparatus may be a computing device (e.g., a processor in communication with a memory) located on or off of the turbofan engine 100. The controller 162 communicates with the temperature sensor 152, pressure sensor 154, and/or chemical sensor 158 via the wires 160 to receive data from the temperature sensor 152 (e.g., temperature data). In one embodiment, the controller 162 is an engine controller such as Full Authority Digital Engine Control (FADEC). In one embodiment, the controller 162 is a computer of the aircraft associated with the turbofan engine 100. In one embodiment, the seal monitoring apparatus 150 includes its own standalone computing device mounted to the turbofan engine 100 as the controller 162. The controller 162 may be comprised of multiple computing devices of the turbofan engine 100, seal monitoring apparatus 150, and/or aircraft communicating with one another. The controller 162 may communicate data (e.g., sensor data, alerts, warnings) to other computers or controllers of the turbofan engine 100 and/or associated aircraft, for example, via a wired and/or wireless connection therebetween. The controller 162 may further include an off-board computer (e.g., a ground-based computer) in communication with another computer onboard the aircraft, such as a computer of the turbofan engine 100 and/or aircraft. For example, the seal monitoring apparatus may collect data during a flight and communicate the data to the ground-based computer after the flight to determine the condition of the seal (e.g., remaining seal life).

In some forms, the controller 162 receives data from a temperature sensor 152 and/or and oil viscosity sensor of the core turbine engine 16 positioned to measure the temperature and/or viscosity of the lubrication oil in the bearing sump 110. The controller 162 may determine a change in temperature and/or viscosity of the oil due to the seal 124 rubbing against the seal mating ring 122 in addition to or as an alternative to using the temperature sensor 152.

With reference to FIG. 5, a method 350 of monitoring the seal 124 with the seal monitoring apparatus 150 is provided. The controller 162 may receive 352 measured temperature data from the temperature sensor 152 mounted at the seal 124. The controller 162 may receive the data via the wires 160 of the temperature sensor 152. The wires 160 may extend through the internal cavity of a guide vane 106. The wires 160 may extend through the second lumen 174 of the multi-lumen conduit 170 positioned to extend through the internal cavity of the guide vane 106. The controller 162 may process the data received from the temperature sensor 152, pressure sensor 154, and/or chemical sensor 158 to determine a condition of the seal 124, for example, the cumulative wear of the seal 124, remaining useful life of the seal 124, and/or whether the seal 124 is in a failure condition. In some forms, the controller 162 monitors the condition of the seal 124 in real time. In some forms, the sensor data is stored in memory and processed by the controller 162 at a later time. For example, a computing device of the controller 162 onboard the aircraft may store sensor data collected during a flight in memory and may transmit the sensor data to a computing device of the controller 162 (e.g., a ground-based computer) for processing after the flight.

Figure 6:
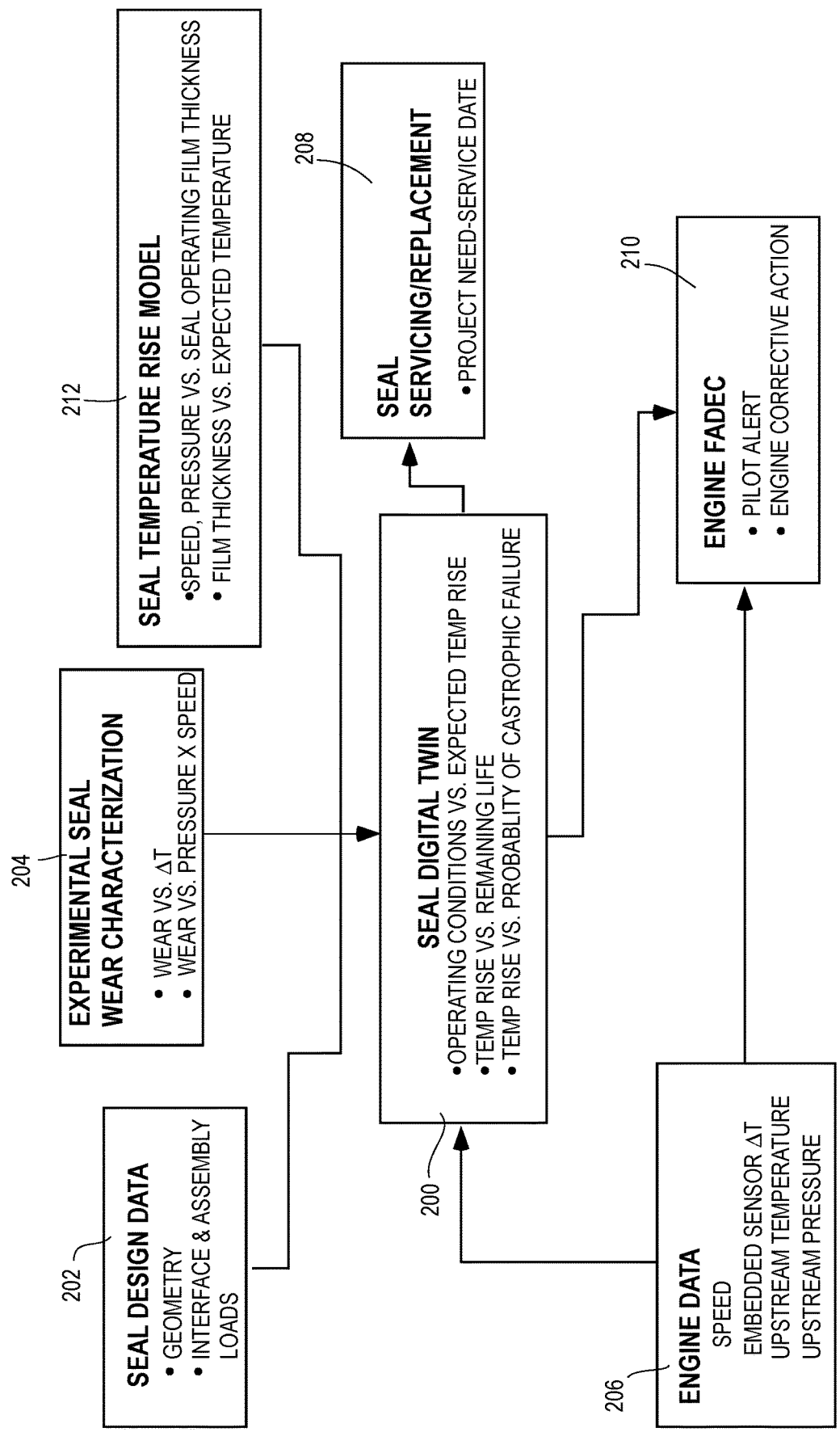
FIG. 6 is an input-output diagram of a model used to determine a condition of the seal of FIG. 3.

With respect to FIG. 6, the controller 162 may use a seal digital twin model 200 to determine the conditions of the seal 124. The seal digital twin model 200 may be a digital model or representation of the seal 124 stored in a memory of the controller 162 that is used to track accumulated wear or damage to the seal 124 over time (e.g., one or more flights) to store an estimated current condition of the seal 124. The seal digital twin model 200 may be configured to receive one or more monitored operating conditions as inputs into the model to estimate and/or record the impact of the monitored operating conditions on the seal 124. The seal digital twin model 200 may output a signal based on the determined condition of the seal, for example, whether the seal 124 is in a good condition, service condition (e.g., in need of servicing/replacement), or a failure condition (e.g., failed or failure imminent).

To determine the condition of the seal 124, the seal digital twin model 200 may use seal design data 202, an experimental wear dataset 204, and a seal temperature rise model 212 to model the impact of the engine dataset 206 (e.g., the monitored operating conditions) on the seal 124. The seal design data 202 may include physical details about the seal 124. The seal design data 202 may include, for example, the geometry of the seal 124 such as the shape (e.g., ring) and size (e.g., inner and/or outer diameter) of the seal 124. The geometry of the seal 124 may also include details of the one or more grooves and teeth of the seal 124, such as the groove depth and pattern on the seal 124. The seal design data 202 may include details of the interface and assembly loads of the seal, for example, the rotational speed at which the seal 124 is to separate from the seal mating ring 122 during normal operation, e.g., when the seal mating ring 122 rotates at 500 RPM. The interface and assembly load of the seal 124 may include the biasing force of the bellows spring 128 on the carrier 126. The seal design data 202 may also include the material composition of the seal 124 (e.g., the grade of graphite of the seal).

The experimental seal wear dataset 204 may include wear rate data that is collected experimentally, for example, by collecting data while simulating the wear conditions of the seal 124. For example, the wear rate of a seal or test material having the same composition as the seal may be measured and monitored while applying a load to the seal or test material at various contact pressures and/or surface speeds. With respect to FIG. 7, an example graph 220 is provided showing the measured wear rate for various seals as a function of the contact pressure multiplied by the surface speed. The graph 220 may be generated based on the experimentally collected wear rate data for multiple types (e.g., sizes, shapes, compositions) of seals 124 and at different conditions (e.g., environmental temperatures). For example, graph 220 includes a first line 222 generated based on data collected for a seal 124 of a first graphite composition at a first environmental temperature, a second line 224 generated based on data collected for a seal of a second graphite composition at the first environmental temperature, and a third line 226 generated based on data collected for a seal of a second graphite composition at a second environmental temperature. The environmental temperature may be the temperature of the fluids and components around the seal. This data of graph 220 is provided by way of example any number of different types of seals may similarly be tested and/or the seals may be tested at additional temperatures (e.g., those within the normal operating range of the seal 124). From the experimental data of graph 220, the following relation is seen:

$$\text{Wear Rate} \propto PVT \tag{1}$$

where P is the contact pressure, V is the surface speed of the seal relative to the sealing surface, and T is the environmental temperature. Moreover, from this data, the wear rate for each type of seal may be calculated as a function of the contact pressure multiplied by the surface speed multiplied by a function of the environmental temperature which is described by the following relation:

$$\text{Wear Rate} = f(PV)g(T) \tag{2}$$

The equations for the wear rate for each type of seal may be calculated, for example, by fitting a curve through the data collected for each type of seal and/or at each environmental temperature. The experimental data may be interpolated and/or extrapolated to predict the wear rate under conditions where data was not collected (e.g., at other environmental temperatures).

Figure 8:
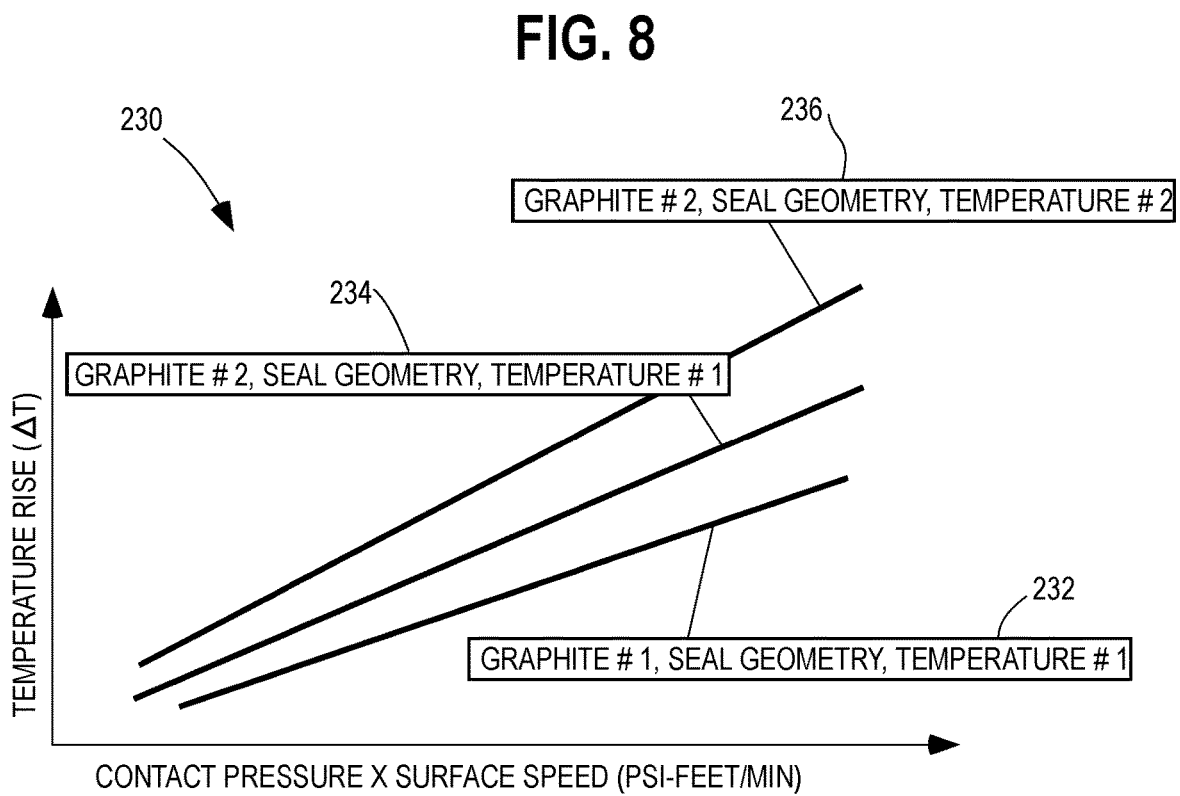
FIG. 8 is a graph illustrating a correlation of a temperature rise of the seal of FIG. 3 with a contact pressure and surface speed.

With respect to FIG. 8, an example graph 230 is provided showing the temperature rise of the seal or test material graphed as a function of the contact pressure multiplied by the surface speed. The graph 230 may be generated based on the data collected while monitoring the temperature rise of the seal as the load is applied to the seal or test material at various contact pressures and/or surface speeds. Graph 230 includes a first line 232 generated based on data collected for the seal of the first graphite composition at the first environmental temperature, a second line 234 generated based on data collected for the seal of the second graphite composition at the first environmental temperature, and a third line 236 generated based on data collected for the seal of the second graphite composition at the second environmental temperature. This data of graph 230 is provided by way of example any number of different types of seals may similarly be tested and/or the seals may be tested at additional temperatures. The experimentally data may be interpolated and/or extrapolated to predict the temperature under conditions where data was not collected (e.g., at other environmental temperatures). From the experimental data of graph 230, it is seen that the temperature rise (ΔT) of the seal 124 is directly related to the contact pressure multiplied by the surface speed of the seal. Moreover, it is seen that the contact pressure multiplied by the surface speed of the seal (PV) may be calculated as a function of the temperature rise (ΔT) of the seal 124:

$$f(PV)=h(\Delta T). \qquad (3)$$

Thus, relation (2) above may be modified so that the wear rate may be calculated based on the environmental temperature (T) and the temperature rise (ΔT):

$$\text{Wear Rate}=h(\Delta T)g(T). \qquad (4)$$

Returning to FIG. 6, the controller 162 may use the seal design data 202 to determine which experimental wear dataset 204 to use in estimating the wear of the seal 124, for instance, experimental wear data associated with the design of the seal 124 being monitored by the seal monitoring apparatus 150. For example, where the seal 124 is formed of the first graphite composition, the controller 162 may reference the data (e.g., equations, graphs, lookup tables, etc.) associated with the first graphite composition (e.g., the data associated with the first line 222 of graph 220 and the first line 232 of graph 230). As noted above, the graphs of FIGS. 7 and 8 are provided as examples of the data collected experimentally to determine a correlation between the temperature rise of the seal and the wear rate. Additional data may similarly be collected under different conditions (e.g., different environmental temperatures, different types of seals) to provide a more complete dataset for estimating the wear rate of the monitored seal 124.

In use with the turbofan engine 100, the controller 162 may receive engine data 206 and calculate the wear rate of the seal 124 by inputting the real time engine conditions into the seal digital twin model 200. The engine data 206 may include the speed of the turbofan engine 100, such as the speed of the of the low-pressure turbine spool 36 (N1) and/or the speed of the high-pressure turbine spool 34 (N2), the temperature data of the seal 124 measured by the temperature sensor 152, the environmental temperature at the seal 124 such as the temperature at the exit of the low-pressure compressor 22 (T2), the pressure at the seal 124 measured by the pressure sensor 154, the pressure at the exit of the high-pressure compressor 24 (P3), the fuel mass flow into the combustion section 26 (WFM), etc. The controller 162 may calculate the wear rate of the seal 124 using the engine data 206 and the experimental wear dataset 204 described above.

To determine the temperature rise (ΔT) of the seal 124 due to the seal 124 rubbing against the sealing surface 134 of the seal mating ring 122, and with reference to FIG. 5, the controller 162 may estimate 354 an expected temperature for the seal 124 when the seal 124 is operating as intended, with an air film between the seal 124 and the seal mating ring 122, based on the speed of the turbofan engine 100 (e.g., RPM of the associated spool). The expected temperature of the seal 124 may be calculated using the seal temperature rise model 212 (see FIG. 6). The seal temperature rise model 212 may correlate a rotational speed of the rotor 102 (and thus the sealing surface 134) to an expected temperature of the seal 124 where the seal 124 is operating normally with an air film between the seal 124 and the sealing surface 134. More specifically, when the seal 124 is operating as intended, the thickness of the gap (the air film) between the seal and the seal mating ring 122 may be predicted based on the speed at which the rotor 102 (and thus the sealing surface 134) is rotating. For example, the controller 162 may input the speed of the sealing surface 134 into an equation or lookup table or otherwise use a dataset to retrieve a thickness of the air film for the seal 124. Other information such as seal geometry, bellows spring preload (e.g., initial compression), seal operating environment (e.g., upstream pressure, downstream pressure, upstream air temperature) may also be used in the calculation. The temperature of the seal 124 may increase as the sealing surface 134 rotates due to windage heat generated by the viscous drag of the air of the air film on the seal 124 as sealing surface 134 rotates relative to the seal 124. The windage heat generated is dependent on the gap or air film thickness between the seal 124 and the seal mating ring sealing surface 134. The controller 162 may, for example, input the determined thickness of the air film into an equation or lookup table or otherwise use a dataset to retrieve a windage heat of the seal 124 based upon the air film thickness. The equations, lookup tables, or other dataset used by the controller 162 may be generated from experimentally collected data for the seal 124 or mathematical models predicting seal behavior. Based on the speed of the turbofan engine 100, the windage heat may be estimated for the seal 124 under normal operation and the controller 162 may estimate the expected temperature of the seal 124 calculated based on the estimated windage heat.

Figure 9:
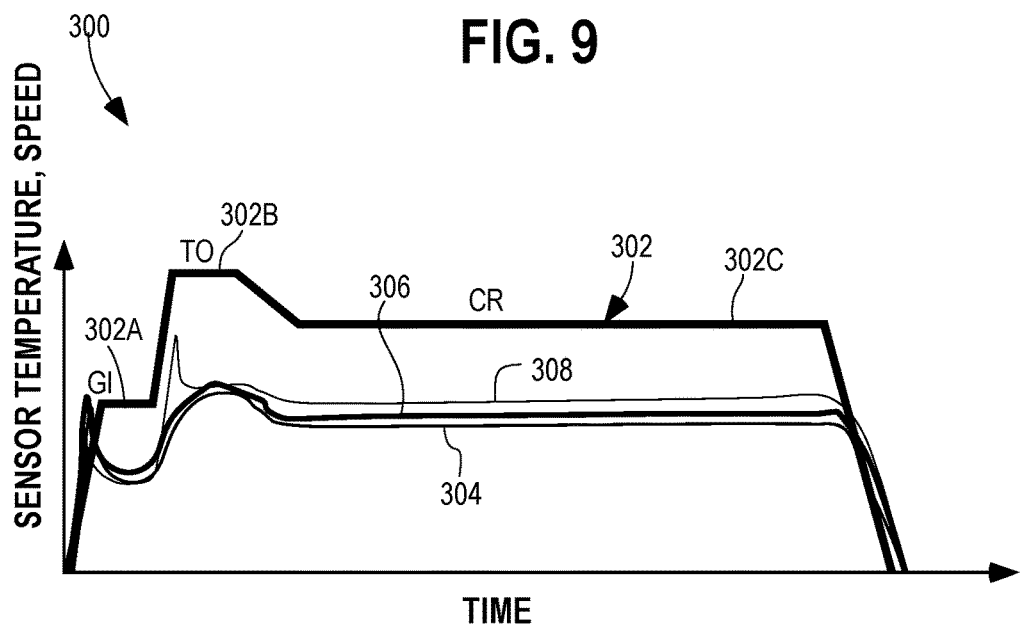
FIG. 9 is a graph showing temperature data collected by the seal monitoring apparatus of FIG. 3 during flights.

With respect to FIG. 9, a graph 300 is provided showing a line 302 of the speed (RPM) of the turbofan engine 100 as the turbofan engine 100 is operated through stages of a flight including ground idle 302A, takeoff 302B, and cruise 302C. For the low-pressure compressor 22, the speed of the turbofan engine 100 may be a speed of the low-pressure turbine spool 36, however, for other seals of the turbofan engine 100 (e.g., carbon seals), the speed of the high-pressure turbine spool 34 may be used. The controller 162 estimates an expected temperature of the seal 124 over time as the turbofan engine 100 goes through these flight stages at varying RPM. For example, as explained above, the speed of the seal mating ring 122 relative to the seal 124 may be used to estimate the thickness of the air film and ultimately the expected temperature of the seal 124. The graph 300 includes a line 304 that shows the expected temperature of the seal 124 at the varying engine speeds during the course of a flight. The graph further includes lines 306 and 308 that are generated from temperature data of the seal 124 collected by the temperature sensor 152 during a first and second flight, respectively. As shown, the temperature of the seal 124 during the first and second flights deviate from the expected temperature at various points over the course of the flight.

Figure 10:
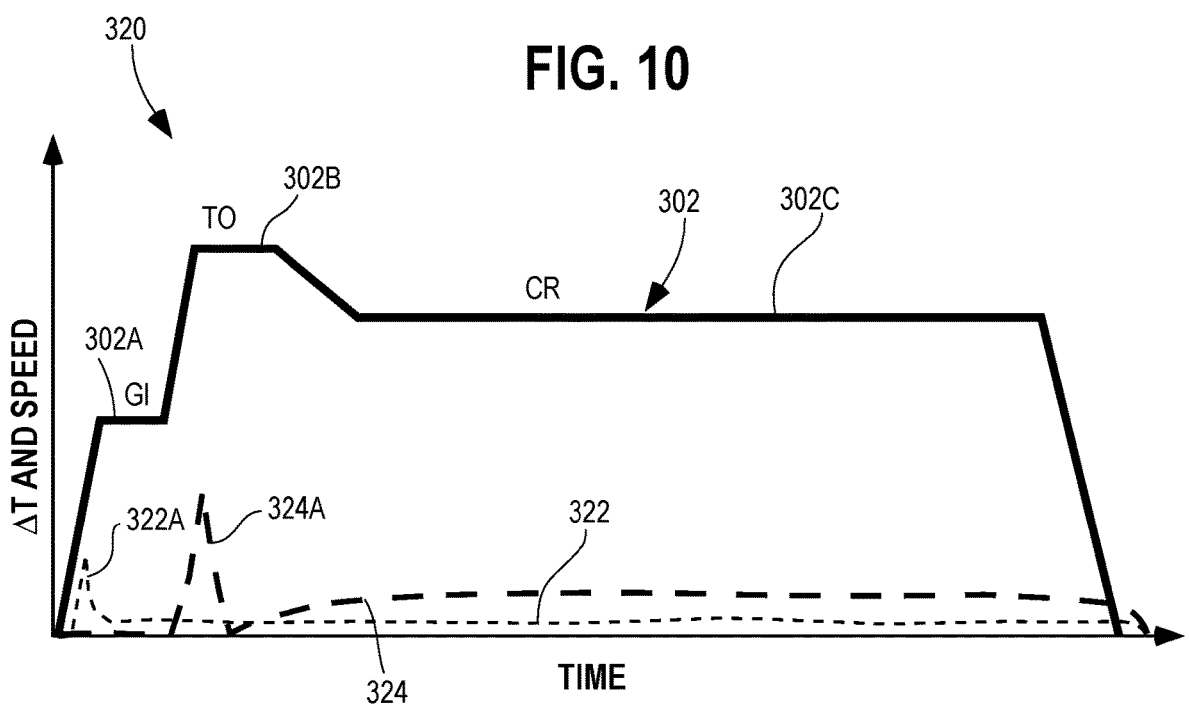
FIG. 10 is a graph comparing an actual temperature of the seal of FIG. 3 with the expected temperature of the seal during flights.

With reference to FIG. 5, the controller 162 determines 356 a condition of the seal based on the temperature difference of the measured temperature data from the expected temperature data. With respect to FIG. 10, a graph 320 is provided showing the deviation of the measured temperature of the seal 124 from the expected temperature over the course of the flights. For example, line 324 shows the expected temperature of the seal 124 of line 304 in graph 300 subtracted from the measured temperature of the second flight of line 308 of graph 300 (measured seal temperature−expected seal temperature). As shown, the measured temperature of the seal 124 is higher than expected during takeoff as shown by the spike 324A in the line 324 at the time of takeoff 302B. The temperature of the seal 124 spikes for a period of time before returning to or near the expected temperature. The temperature of the seal 124 may increase for a period of time while the seal 124 rubs against the seal mating ring 122 which creates heat due to friction. The temperature of the seal 124 may subsequently fall or return to or near the expected temperature after the portion of the seal 124 that was rubbing has worn away.

The graph 320 further includes a line 322 that shows the expected temperature of the seal 124 of line 304 in graph 300 subtracted from the measured temperature of the first flight of line 306 of graph 300. In this first flight, the seal 124 is rubbing against the seal mating ring 122 during the ground idle 302A stage of the flight resulting in the spike 322A indicating the measured temperature is higher than the expected temperature.

Figure 7:
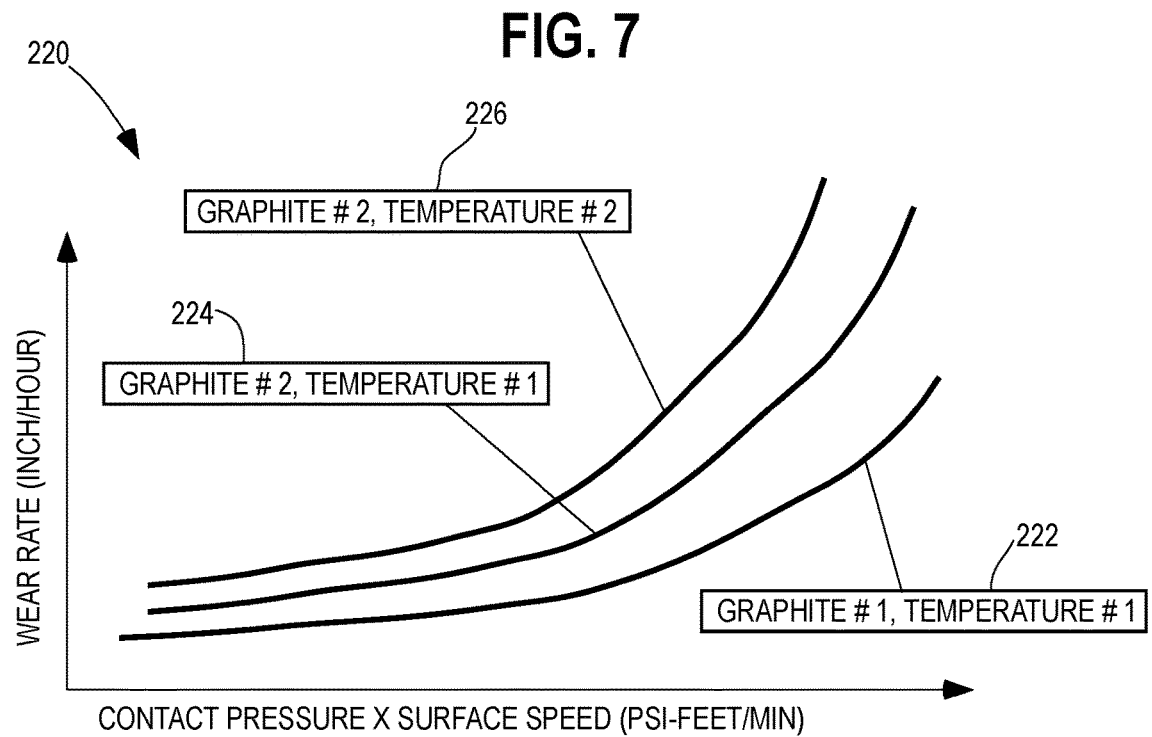
FIG. 7 is a graph illustrating a correlation of the wear rate of the seal of FIG. 3 with a contact pressure and surface speed.

The increase in temperature of the seal 124 due to rubbing of the seal 124 against the seal mating ring 122 is analogous to the experimental wear data 204 of FIGS. 7 and 8 discussed above. Where the temperature rise (ΔT) of the seal 124 from the expected temperature is known (e.g., lines 322, 324 of FIG. 10), the contact pressure multiplied by the surface speed may be determined using the data associated with the graph 230 of FIG. 8 that corresponds to the monitored seal 124 and environmental temperature. Once the contact pressure multiplied by surface speed is known, the wear rate of the seal 124 may be determined using the data associated with the graph 220 of FIG. 7 that corresponds to the seal 124 and environmental temperature. In another approach, the controller 162 may reference the experimental wear dataset 204 to determine the wear rate equation of relation (4) above corresponding to the seal 124 and calculate the wear rate by entering the difference of the measured temperature of the seal 124 from the expected (ΔT) and the measured environmental temperature into the equation.

In some forms, the wear rate of the seal 124 may similarly be determined by monitoring the temperature and/or viscosity of the oil in the bearing sump 110 adjacent the seal 124, for example, using a sensor of the core turbine engine 16 positioned in the bearing sump 110. Experimental data may be collected similar to the experimental data of FIGS. 7 and 8 that correlate the change in oil temperature and/or viscosity to a wear rate. In use, the controller 162 may monitor the oil temperature and/or viscosity and reference the experimental data model to determine a wear rate of the seal 124 based on the current conditions of the turbofan engine 100, seal 124, and the lubrication oil in the bearing sump 110.

Upon determining the wear rate, the controller 162 may determine the wear of the seal 124 by determining the length of time the seal 124 is at any given wear rate. The controller 162 may multiple the wear rate by the time the seal 124 is at the wear rate to determine the amount of wear (e.g., in inches) for that period of time. The controller 162 may sum the wear for each segment of time to determine the total wear of the seal 124 over all of the segments of time. For instance, the controller 162 may calculate the wear of the seal 124 during one flight according to the following relation:

$$\text{Wear in One Flight} = \Sigma_{i=1}^{\text{time steps}} \text{Wear Rate}[(\Delta T)g(T)]_i \Delta t_i \quad (5)$$

The controller 162 may further determine the wear of the seal 124 over several flights, for example, over the lifetime of the seal 124 by adding the wear calculated during each individual flight according to the following relation:

$$\text{Cumulative Wear after } Z \text{ Flights} = \Sigma_{j=1}^{Z} (\Sigma_{i=1}^{\text{time steps}} \text{Wear Rate}[(\Delta T)g(T)]_i \Delta t_i)_j \quad (6)$$

The controller 162 may use the seal digital twin model 200 as described above to monitor the cumulative wear of the seal 124 over the lifetime of the seal 124 and to determine when the seal 124 should be serviced 208. For instance, the controller 162 may determine the health or remaining useful life of the seal to determine when the seal should be replaced. The controller 162 may determine the seal should be replaced when the cumulative wear of the seal 124 exceeds a percentage of a dimension of the seal 124. For example, the seal 124 may need to be serviced when more than 50% of the thickness of the seal 124 has been worn away. In one particular example, where the seal 124 has grooves or teeth that cause the seal 124 to separate from the sealing surface 134 as discussed above, the controller 162 may determine that the seal 124 should be serviced when more than 50% of the original thickness of the teeth have worn away or the depth of the groove is less than 50% of its original depth. The controller 162 may estimate a remaining useful life of the seal 124 based on the cumulative wear of the seal 124 and the amount of wear the seal 124 is able to handle before needing to be replaced.

With reference again to FIG. 5, where the controller 162 determines that the seal 124 has reached the end of its remaining useful life, and/or needs to be serviced, the controller 162 may output 358 a signal indicating that the seal 124 has entered a service condition and needs maintenance. The controller 162 may communicate a message to a computer of the aircraft or turbofan engine 100, such as the engine FADEC 210, that the seal 124 should be replaced and/or when the seal 124 should be replaced. The controller 162 may include a ground-based computer that determines when the seal needs to be serviced and may send a message to a computer of the aircraft, a maintenance crew, etc. upon determining the seal 124 should be replaced. The controller 162 may send the alert when the life expectancy of the seal 124 falls below a predetermined threshold (e.g., 20% of seal life remaining) so that the seal 124 may be serviced before it enters a failure condition (e.g., cracks, fails to separate from the sealing surface, etc.). The controller 162 thus predicts when the seal 124 needs to be replaced (e.g., is in a service condition) and sends an alert so that action may be taken before the seal 124 fails during a flight. The controller 162 may also be configured to output the predicted life expectancy of the seal 124 before the seal 124 needs to be serviced, for example, responsive to a request for the current condition of the seal 124. The controller 162 may be able to estimate a date when the seal 124 should be serviced by based on the historical wear data of the seal 124 (e.g., the average wear per flight) and/or the flight schedule of the aircraft with which the seal 124 is associated.

The controller 162 may also determine when failure of the seal 124 is imminent and/or when the seal 124 has failed. The controller 162 may determine that failure of the seal 124 is imminent when the measured temperature of the seal 124 (measured by the temperature sensor 152) exceeds the expected temperature by a predetermined threshold, for example, 100 degrees Fahrenheit. A deviation of the measured temperature from the expected beyond the threshold may be indicative that the seal 124 is wearing too quickly and/or that the contact pressure of the seal 124 against the seal mating ring 122 is too great which may indicate a problem with the seal 124 or turbofan engine 100. The controller 162 may also monitor the pressure of the cavity upstream and/or downstream of the seal 124 (e.g., using pressure sensor 154) to detect rapid changes in pressure that may indicate the seal 124 has failed (e.g., the pressure equalized across the seal 124). The controller 162 may receive data from the chemical sensor 158 to detect the presence of lubrication oil outside of the bearing sump 110. The controller 162 may determine that the seal has failed upon detecting oil or more than a threshold amount of oil outside of the bearing sump 110.

Where the controller 162 determines the seal 124 is in a failure condition (e.g., impending failure or the seal has failed), the controller 162 may output 358 a signal to cause the turbofan engine 100 to operate in a restricted or reduced performance mode. For example, the controller 162 may communicate a message to a computer of the aircraft or turbofan engine 100, such as the engine FADEC 210, that the seal 124 is failing or has failed to cause the computer of the aircraft or turbofan engine 100 to operate the turbofan engine 100 in a reduced performance mode. The reduced performance mode may be a mode of operation where the speed (e.g., RPM) of the turbofan engine 100 is limited.

Figure 11:
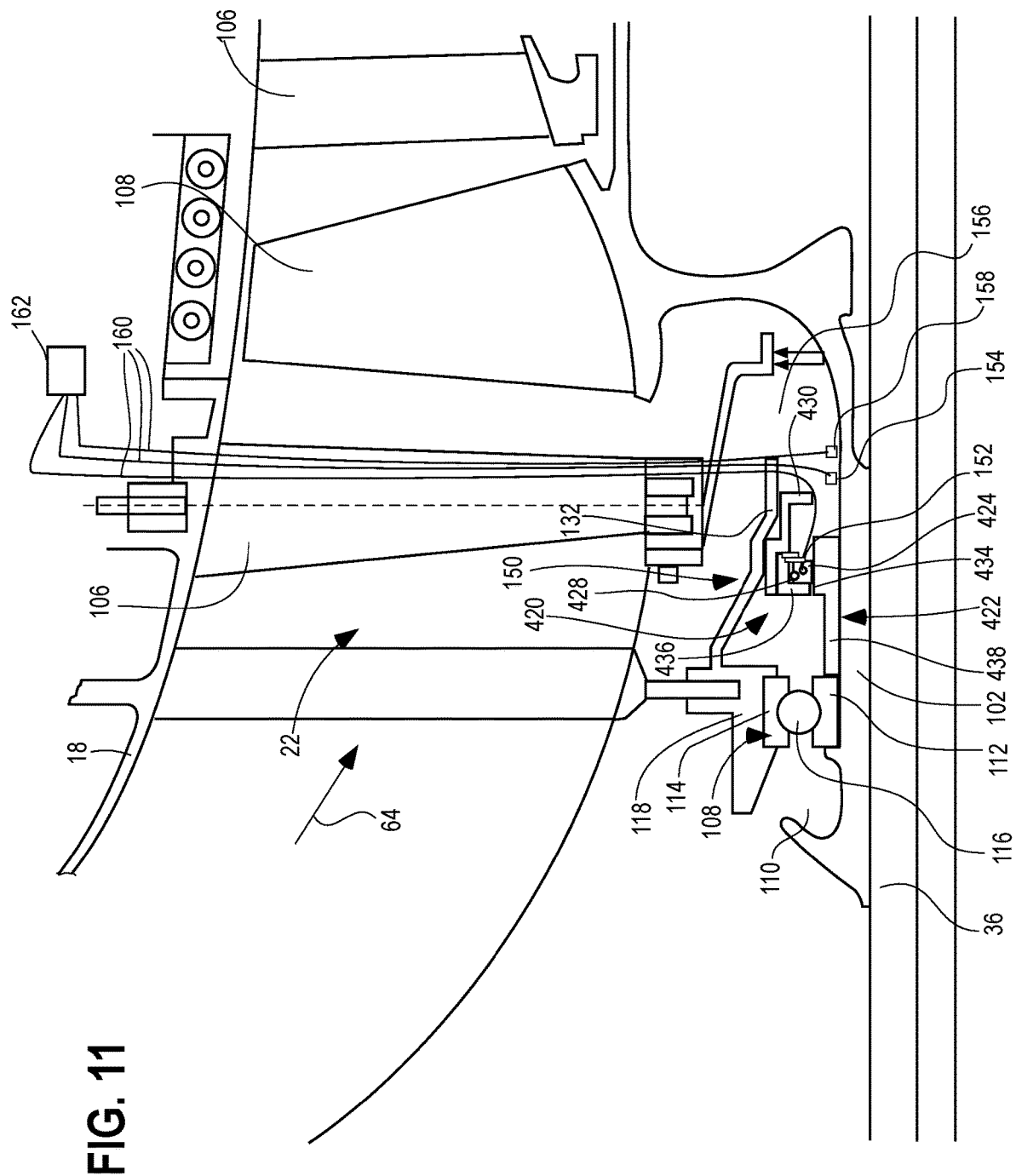
FIG. 11 is a detail view of the gas turbine engine of FIG. 2 including a seal according to another embodiment and the seal monitoring apparatus.

While the seal monitoring apparatus 150 is described above for monitoring the seal 124 of the seal system 120 (e.g., the carbon face seal), the seal monitoring apparatus 150 may similarly be used to monitor seals of other types of seal systems. For example, and with respect to FIG. 11, the seal monitoring apparatus 150 may similarly be used to monitor a carbon circumferential seal system 420. With reference to FIG. 11, a detail view of a section of the turbofan engine 100 at the low-pressure compressor 22 is shown similar to that of FIG. 3 and including a seal system 420 that retains the lubricating oil within the bearing sump 110. The seal system 420 inhibits the lubricating oil or oil mist from flowing out of the bearing sump 110 and into the core flow path through which the portion 64 of air flows.

The seal system 420 may include a seal such as seal ring assembly 424, a mating ring 422, a garter spring 428, a seal adaptor 430, and a cartridge 436. The seal adaptor 430 has a radial outer surface configured to engage the support flange 132 of the turbofan engine 100. For example, the seal adaptor 430 may be press-fitted into the support flange 132 to form a fluid tight connection therebetween. The seal adaptor 430 may include an inner surface for receiving a cartridge 436. The cartridge 436 may support the seal ring assembly 424 and the garter spring 428 and may be inserted into the seal adaptor 430. For example, the cartridge 436 may be pressed into the seal adaptor 430 to attach the seal ring assembly 424 to the seal adaptor 430.

The seal ring assembly 424 may include a plurality of segments attached together to form a seal ring having a radially inner surface that interacts with a sealing surface 434 of the seal mating ring 422 to form fluid tight seal therebetween. The garter spring 428 extends about the circumference of the seal ring assembly 424 and biases the seal ring assembly 424 radially inward toward the sealing surface 434 of the seal mating ring 422. The segments of the seal ring assembly 424 may be formed at least in part of carbon, for example, the segments may be formed of graphite. The seal ring assembly 424 engages the sealing surface 434 of the seal mating ring 422 which may include one or more grooves on the radially outer face. The grooves may form one or more shallow depressions on the mating ring sealing surface 434 that may contact the seal ring assembly 424. The grooves may provide the sealing surface 434 with aerodynamic characteristics that cause the seal ring assembly 424 to overcome the biasing force of the garter spring 428 and separate from the sealing surface 434 of the seal mating ring 422 as the seal mating ring 422 is rotated as described in further detail below.

The seal mating ring 422 may have a cylindrical portion 438 having an inner diameter sized to receive the rotor 102. The cylindrical portion 438 extends axially along the rotor 102 and may abut the bearing 108 to set the location of the sealing surface 434 relative to the seal ring assembly 424. The seal mating ring 422 is secured to the rotor 102 such that the seal mating ring 422 rotates with the rotor 102.

When the rotor 102 is stationary or not rotating, the seal ring assembly 424 may be biased against the sealing surface 434 by the garter spring 428. During normal operation, as the rotor 102 rotates and exceeds a revolutions per minute (RPM) threshold, the seal ring assembly 424 and the sealing surface 434 separate forming a gap therebetween (e.g., the seal ring assembly 424 moves radially outward). The separation of the seal ring assembly 424 from the sealing surface 434 may be caused by the grooves of the sealing surface 434 of the mating ring 422 that act as a pump as the sealing surface 434 rotates thus creating an air film that the seal ring assembly 424 rides on. The gap or air film between the seal ring assembly 424 and the sealing surface 434 may be, for example, about 0.0003 to 0.001 inches and may vary with the speed of rotation of the sealing surface 434. The air film formed between the seal ring assembly 424 and the sealing surface 434 inhibits fluid from passing therebetween. The seal ring assembly 424 thus forms an air film seal with the sealing surface 434 during normal operation such that the seal ring assembly 424 does not wear against the sealing surface 434 at certain rotation speeds (e.g., those above the RPM threshold).

In some instances, however, the seal ring assembly 424 does not separate from the sealing surface 434 and contacts or rubs against the sealing surface 434 as described above. The seal monitoring apparatus 150 may be similarly by used to monitor the condition of the seal system 420 as described above. As shown, the temperature sensor 152 of the seal monitoring apparatus 150 may be positioned to monitor the temperature of the seal ring assembly 424 (e.g., the real time temperature). For example, the temperature sensor 152 may be embedded in the seal ring assembly 424. The seal monitoring apparatus 150 may further include the pressure sensor 154 and/or chemical sensor 158 positioned in the high-pressure cavity 156 adjacent the seal system 420. The data collected by the sensors of the seal monitoring apparatus 150 may be received at the controller 162 and processed as described above to determine the condition of the seal and to output signals based on the determined condition of the seal.

While the foregoing discussion describes the use of the seal monitoring apparatus 150 in use with the film riding seal 124 of the bearing sump 110 at the low-pressure compressor 22, the seal monitoring apparatus 150 may similarly be used to monitor the condition of other film riding seals at the other bearing sumps 110 of the turbofan engine 100. Moreover, while the seal monitoring apparatus 150 has been described in use with film riding seals of a turbofan engine of an aircraft, the seal monitoring apparatus 150 may similarly be used to monitor the condition of film riding seals of other devices, including, as an example, a gas turbine generator, steam turbine, land-based or flying turbines using working fluids such as hydrogen and/or supercritical carbon dioxide.

Further aspects of the disclosure are provided by the subject matter of the following clauses:

A seal monitoring apparatus comprising: a temperature sensor mounted at a seal of a device; and a controller in communication with the temperature sensor, the controller configured to: receive measured temperature data from the temperature sensor; calculate expected temperature data for the seal based at least in part on operating conditions of the device; and determine a condition of the seal based at least in part on a temperature difference of the measured temperature data from the expected temperature data.

The seal monitoring apparatus of any preceding clause wherein the seal is a carbon seal and the temperature sensor is embedded in the seal.

The seal monitoring apparatus of any preceding clause wherein to calculate the expected temperature data includes inputting the operating conditions of the device into a model of the seal configured to output the expected temperature data based at least in part on the input operating conditions and a characteristic of the seal.

The seal monitoring apparatus of any preceding clause wherein the device is an engine and the operating conditions includes one or more of an engine speed, a temperature on at least one of a first side and a second side of the seal, a pressure on at least one of the first side and the second side of the seal.

The seal monitoring apparatus of any preceding clause wherein to determine the condition of the seal includes estimating a wear rate of the seal based on the temperature difference.

The seal monitoring apparatus of any preceding clause wherein estimating the wear rate of the seal includes referencing one or more datasets of the seal correlating the temperature difference to the wear rate.

The seal monitoring apparatus of any preceding clause wherein to determine the condition of the seal includes estimating one or more wear rates of the seal based on the temperature difference over time and determining a cumulative wear of the seal over time based at least in part on a time the seal is at each of the one or more wear rates.

The seal monitoring apparatus of any preceding clause wherein to determine the condition of the seal includes estimating a remaining life expectancy of the seal.

The seal monitoring apparatus of any preceding clause wherein the controller is further configured to output a signal upon determining a change in the condition of the seal, the signal indicating the seal is in a failure condition and/or to service the seal.

The seal monitoring apparatus of any preceding clause wherein the device is an engine including a guide vane, wherein one or more wires of the temperature sensor extend to the controller through a lumen of a multi-lumen pipe that extends through a cavity of the guide vane.

The seal monitoring apparatus of any preceding clause further comprising a pressure sensor mounted at the seal and in communication with the controller, the controller configured to receive pressure data from the pressure sensor and determine a condition of the seal based at least in part on the pressure data of the pressure sensor.

The seal monitoring apparatus of any preceding clause further comprising a chemical sensor mounted at the seal and in communication with the controller, the controller configured to receive chemical data from the chemical sensor and determine a condition of the seal based at least in part on the chemical data of the chemical sensor.

The seal monitoring apparatus of any preceding clause further comprising a viscosity sensor mounted at the seal and in communication with the controller, the controller configured to receive oil viscosity data from the viscosity sensor and determine a condition of the seal based at least in part on the oil viscosity data of the viscosity sensor.

A seal monitoring apparatus comprising: a controller in communication with a temperature sensor mounted at a seal of a device, the controller configured to: receive measured temperature data from the temperature sensor; calculate expected temperature data for the seal based at least in part on operating conditions of the device; and determine a condition of the seal based at least in part on a temperature difference of the measured temperature data from the expected temperature data.

The seal monitoring apparatus of any preceding clause wherein to calculate the expected temperature data includes inputting the operating conditions of the device into a model of the seal configured to output the expected temperature data based at least in part on the input operating conditions and a characteristic of the seal.

The seal monitoring apparatus of any preceding clause wherein the device is an engine and the operating conditions includes one or more of an engine speed, a temperature on at least one of a first side and a second side of the seal, a pressure on at least one of the first side and the second side of the seal.

The seal monitoring apparatus of any preceding clause wherein to determine the condition of the seal includes estimating a wear rate of the seal based on the temperature difference.

The seal monitoring apparatus of any preceding clause wherein estimating the wear rate of the seal includes referencing one or more datasets of the seal correlating the temperature difference to the wear rate.

The seal monitoring apparatus of any preceding clause wherein to determine the condition of the seal includes estimating one or more wear rates of the seal based on the temperature difference over time and determining a cumulative wear of the seal over time based at least in part on a time the seal is at each of the one or more wear rates.

The seal monitoring apparatus of any preceding clause wherein to determine the condition of the seal includes estimating a remaining life expectancy of the seal.

The seal monitoring apparatus of any preceding clause wherein the controller is further configured to output a signal upon determining a change in the condition of the seal, the signal indicating the seal is in a failure condition and/or to service the seal.

The seal monitoring apparatus of any preceding clause wherein the controller is further in communication with a pressure sensor mounted at the seal, the controller configured to receive pressure data from the pressure sensor and determine a condition of the seal based at least in part on the pressure data of the pressure sensor.

The seal monitoring apparatus of any preceding clause wherein the controller is further in communication with a chemical sensor mounted at the seal, the controller configured to receive chemical data from the chemical sensor and determine a condition of the seal based at least in part on the chemical data of the chemical sensor.

The seal monitoring apparatus of any preceding clause wherein the controller is further in communication with a viscosity sensor mounted at the seal, the controller configured to receive oil viscosity data from the viscosity sensor and determine a condition of the seal based at least in part on the oil viscosity data of the viscosity sensor.

A method of monitoring a seal comprising: receiving, at a processor, measured temperature data from a temperature sensor mounted at the seal of a device; calculating expected temperature data for the seal based at least in part on operating conditions of the device; and determining a condition of the seal based at least in part on a temperature difference of the measured temperature data from the expected temperature data.

The method of any preceding clause wherein the seal is a carbon seal and the temperature sensor is embedded in the seal.

The method of any preceding clause wherein calculating the expected temperature data includes inputting the operating conditions of the device into a model of the seal, the model configured to output the expected temperature data based at least in part on the input operating conditions and a characteristic of the seal.

The method of any preceding clause wherein the device is an engine and the operating conditions includes one or more of an engine speed, a temperature on at least one of a first side and a second side of the seal, and a pressure on at least one of the first side and the second side of the seal.

The method of any preceding clause wherein determining the condition of the seal includes estimating a wear rate of the seal based on the temperature difference.

The method of any preceding clause wherein estimating the wear rate of the seal includes referencing one or more datasets of the seal correlating the temperature difference to the wear rate.

The method of any preceding clause wherein determining the condition of the seal includes estimating one or more wear rates of the seal based on the temperature difference over time and determining a cumulative wear of the seal over time based at least in part on a time the seal is at each of the one or more wear rates.

The method of any preceding clause wherein determining the condition of the seal includes estimating a remaining life expectancy of the seal.

The method of any preceding clause further comprising outputting a signal upon determining a change in the condition of the seal, the signal indicating the seal is in a failure condition and/or to service the seal.

The method of any preceding clause wherein the device is an engine including a guide vane, wherein one or more wires of the temperature sensor extend to the processor through a lumen of a multi-lumen pipe that extends through a cavity of the guide vane.

An engine comprising a housing; a rotor supported by a bearing such that the rotor is rotatable in the housing, the rotor including at least one airfoil; a seal isolating a bearing sump including the bearing from a cavity of the housing including the at least one airfoil; and a seal monitoring apparatus mounted to the seal and configured to determine a condition of the seal.

The engine of any preceding clause wherein the seal monitoring apparatus includes a temperature sensor embedded in the seal.

A seal monitoring apparatus comprising: one or more pressure sensors mounted at a seal of a turbine to measure pressure on a first side of the seal; and a controller in communication with the one or more pressure sensors, the controller configured to: receive pressure data from the one or more pressure sensors; determine a condition of the seal based at least in part on the pressure data; and output a signal upon determining a change in the condition of the seal.

The seal monitoring apparatus of any preceding clause wherein to determine the condition includes determining the seal is in a failure condition, wherein to output the signal includes sending the signal to cause adjustment of operation of the turbine when the condition is determined to be the failure condition.

The seal monitoring apparatus of any preceding clause wherein the turbine is a turbine engine and wherein to cause adjustment of the operation of the engine includes causing the turbine engine to be operated in a reduced performance mode.

The seal monitoring apparatus of any preceding clause wherein to determine the condition of the seal includes detecting a shift from a first pressure pattern to a second pressure pattern.

The seal monitoring apparatus of any preceding clause wherein detecting the shift from the first pressure pattern to the second pressure pattern includes detecting a shift in one or more of an amplitude characteristic and a frequency of the pressure data.

The seal monitoring apparatus of any preceding clause wherein to determine the condition of the seal includes estimating a life expectancy of the seal based at least in part on the pressure data, and wherein to output the signal includes sending a message to service the seal when the life expectancy falls below a predetermined threshold.

The seal monitoring apparatus of any preceding clause wherein estimating the life expectancy of the seal includes identifying fatigue cycles of the seal based at least in part on a pressure amplitude of the pressure data exceeding a threshold.

The seal monitoring apparatus of any preceding clause wherein estimating the life expectancy of the seal includes updating a model of the seal based at least in part on an amplitude and/or frequency of the pressure data.

The seal monitoring apparatus of any preceding clause wherein the one or more pressure sensors includes a first pressure sensor mounted at the first side of the seal and a second pressure sensor mounted at a second side of the seal.

The seal monitoring apparatus of any preceding clause wherein the turbine is a turbine engine including a guide vane, wherein one or more wires of the one or more pressure sensors extend to the controller through a cavity of the guide vane.

A method of monitoring a seal comprising: receiving, at a processor, pressure data from a pressure sensor mounted at a seal of a turbine, the pressure sensor configured to measure pressure on at least one of a first side of the seal and a second side of the seal; determining a condition of the seal based at least in part on the pressure data; and outputting a signal upon determining a change in the condition of the seal.

The method of any preceding clause wherein determining the condition of the seal includes determining the seal is in a failure condition, wherein outputting the signal includes causing adjustment of operation of the turbine when the condition is determined to be the failure condition.

The method of any preceding clause wherein the turbine is a turbine engine and wherein causing adjustment of the operation of the turbine engine includes causing the turbine engine to be operated in a reduced performance mode.

The method of any preceding clause wherein determining the condition of the seal includes detecting a shift from a first pressure pattern to a second pressure pattern.

The method of any preceding clause wherein detecting the shift from the first pressure pattern to the second pressure pattern includes detecting a shift in one or more of an amplitude characteristic and a pressure frequency of the pressure data.

The method of any preceding clause wherein determining the condition of the seal includes estimating a life expectancy of the seal based at least in part on the pressure data, and wherein outputting the signal includes sending a message to service the seal when the life expectancy falls below a predetermined threshold.

The method of any preceding clause wherein estimating the life expectancy of the seal includes identifying fatigue cycles of the seal based at least in part on the pressure data.

The method of any preceding clause wherein identifying fatigue cycles includes identifying when a pressure amplitude of the pressure data exceeds a threshold.

The method of any preceding clause wherein identifying fatigue cycles includes identifying when a pressure amplitude of one or more select frequencies exceeds a threshold.

The method of any preceding clause wherein estimating the life expectancy of the seal includes updating a model of the seal based at least in part on an amplitude and/or frequency of the pressure data.

A seal monitoring apparatus comprising: a controller in communication with one or more pressure sensors mounted on a first side of a seal of a turbine to measure pressure at the first side of the seal, the controller configured to: receive pressure data from the one or more pressure sensors; determine a condition of the seal based at least in part on the pressure data; and output a signal upon determining a change in the condition of the seal.

The seal monitoring apparatus of any preceding clause wherein to determine the condition includes determining the seal is in a failure condition, wherein to output the signal includes sending the signal to cause adjustment of an operation of the turbine when the condition is determined to be the failure condition.

The seal monitoring apparatus of any preceding clause wherein the turbine is turbine engine and wherein to cause adjustment of the operation of the turbine engine includes causing the turbine engine to be operated in a reduced performance mode.

The seal monitoring apparatus of any preceding clause wherein to determine the condition of the seal includes detecting a change from a first pressure pattern to a second pressure pattern.

The seal monitoring apparatus of any preceding clause wherein detecting the change from the first pressure pattern to the second pressure pattern includes detecting a shift in one or more of an amplitude characteristic and a frequency of the pressure data.

The seal monitoring apparatus of any preceding clause wherein to determine the condition of the seal includes estimating a life expectancy of the seal based at least in part on the pressure data, and wherein to output the signal includes sending a message to service the seal when the life expectancy falls below a predetermined threshold.

The seal monitoring apparatus of any preceding clause wherein estimating the life expectancy of the seal includes identifying fatigue cycles of the seal based at least in part on a pressure amplitude of the pressure data exceeding a threshold.

The seal monitoring apparatus of any preceding clause wherein estimating the life expectancy of the seal includes updating a model of the seal based at least in part on an amplitude and/or frequency of the pressure data.

The seal monitoring apparatus of any preceding clause wherein the one or more pressure sensors includes a first pressure sensor mounted at the first side of the seal and a second pressure sensor mounted at a second side of the seal.

The seal monitoring apparatus of any preceding clause wherein the turbine is a turbine engine including a guide vane, wherein one or more wires of the one or more pressure sensors extend to the controller through a cavity of the guide vane.

An engine comprising: one or more pressure sensors mounted at a seal of the engine to measure pressure on a first side of the seal; and a controller in communication with one or more pressure sensors, the controller configured to: receive pressure data from the one or more pressure sensors; determine a condition of the seal based at least in part on the pressure data; and output a signal upon determining a change in the condition of the seal.

The engine of any preceding clause wherein to determine the condition includes determining the seal is in a failure condition, wherein to output the signal includes sending the signal to cause adjustment of an operation of the engine when the condition is determined to be the failure condition.

The engine of any preceding clause wherein to cause adjustment of the operation of the engine includes causing the engine to be operated in a reduced performance mode.

The engine of any preceding clause wherein the engine is a turbine engine.

The engine of any preceding clause wherein to determine the condition of the seal includes detecting a shift from a first pressure pattern to a second pressure pattern.

The engine of any preceding clause wherein detecting the shift from the first pressure pattern to the second pressure pattern includes detecting a shift in one or more of an amplitude characteristic and a frequency of the pressure data.

The engine of any preceding clause wherein to determine the condition of the seal includes estimating a life expectancy of the seal based at least in part on the pressure data, and wherein to output the signal includes sending a message to service the seal when the life expectancy falls below a predetermined threshold.

The engine of any preceding clause wherein estimating the life expectancy of the seal includes identifying fatigue cycles of the seal based at least in part on a pressure amplitude of the pressure data exceeding a threshold.

The engine of any preceding clause wherein estimating the life expectancy of the seal includes updating a model of the seal based at least in part on an amplitude and/or frequency of the pressure data.

The engine of any preceding clause wherein the one or more pressure sensors includes a first pressure sensor mounted at the first side of the seal and a second pressure sensor mounted at a second side of the seal.

The engine of any preceding clause wherein the engine is a turbine engine including a guide vane, wherein one or more wires of the one or more pressure sensors extend to the controller through a cavity of the guide vane.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosed concept.

What is claimed is:

1. A seal monitoring apparatus comprising:
   a temperature sensor mounted at a seal of an engine;
   a digital twin, the digital twin comprising seal wear characterization data and a seal temperature rise model; and
   a controller in communication with the temperature sensor, the controller configured to:
   receive measured temperature data from the temperature sensor;
   calculate expected temperature data for the seal by applying engine operating conditions to the digital twin; and
   determine a condition of the seal based at least in part on a temperature difference of the measured temperature data from the expected temperature data;
   wherein the controller and sensor are connected together by multiple lumens that are disposed in a cavity, the cavity extending through a guide vane of the engine and the multiple lumens arranged so as not to obstruct airflow through the engine;

wherein the multiple lumens comprise a first lumen that carries air and a second lumen that carries a wire;

wherein the controller is configured to upon detection of a failure condition of the seal transmit a control signal to an aircraft flight controller that causes the aircraft flight controller to operate the engine in a restricted or reduced mode of operation.

2. The seal monitoring apparatus of claim 1 wherein the seal is a carbon seal and the temperature sensor is embedded in the carbon seal.

3. The seal monitoring apparatus of claim 1 wherein the engine operating conditions include one or more of an engine speed, a temperature on at least one of a first side and a second side of the seal, a pressure on at least one of the first side and the second side of the seal.

4. The seal monitoring apparatus of claim 1 wherein to determine the condition of the seal includes estimating a wear rate of the seal based on the temperature difference.

5. The seal monitoring apparatus of claim 4 wherein estimating the wear rate of the seal includes referencing one or more datasets of the seal correlating the temperature difference to the wear rate.

6. The seal monitoring apparatus of claim 1 wherein to determine the condition of the seal includes estimating one or more wear rates of the seal based on the temperature difference over time and determining a cumulative wear of the seal over time based at least in part on a time the seal is at each of the one or more wear rates.

7. The seal monitoring apparatus of claim 1 wherein to determine the condition of the seal includes estimating a remaining life expectancy of the seal.

8. The seal monitoring apparatus of claim 1 wherein the controller is further configured to output a signal upon determining a change in the condition of the seal, the signal indicating the seal is in a failure condition and/or to service the seal.

9. A method of monitoring a seal comprising:
operating a digital twin, the digital twin comprising seal wear characterization data and a seal temperature rise model;
receiving, at a processor, measured temperature data from a temperature sensor mounted at the seal of an engine;
calculating expected temperature data for the seal by applying engine operating conditions to the digital twin; and
determining a condition of the seal based at least in part on a temperature difference of the measured temperature data from the expected temperature data;
wherein the processor and sensor are connected together by multiple lumens that are disposed in a cavity, the cavity extending through a guide vane of the engine and the multiple lumens arranged so as not to obstruct airflow through the engine, wherein the multiple lumens comprise a first lumen that carries air and a second lumen that carries a wire;
upon detection of a failure condition of the seal, transmitting a control signal to an aircraft flight controller that causes the aircraft flight controller to operate the engine in a restricted or reduced mode of operation.

10. The method of claim 9 wherein the engine operating conditions include one or more of an engine speed, a temperature on at least one of a first side and a second side of the seal, and a pressure on at least one of the first side and the second side of the seal.

11. The method of claim 9 wherein determining the condition of the seal includes estimating a wear rate of the seal based on the temperature difference.

12. The method of claim 11 wherein estimating the wear rate of the seal includes referencing one or more datasets of the seal correlating the temperature difference to the wear rate.

13. The method of claim 9 wherein determining the condition of the seal includes estimating one or more wear rates of the seal based on the temperature difference over time and determining a cumulative wear of the seal over time based at least in part on a time the seal is at each of the one or more wear rates.

14. The method of claim 9 wherein determining the condition of the seal includes estimating a remaining life expectancy of the seal.

15. The method of claim 9 further comprising outputting a signal upon determining a change in the condition of the seal, the signal indicating the seal is in a failure condition and/or to service the seal.

16. An engine comprising:
a housing;
a rotor supported by a bearing such that the rotor is rotatable in the housing, the rotor including at least one airfoil;
a seal isolating a bearing sump including the bearing from a cavity of the housing including the at least one airfoil; and
a seal monitoring apparatus mounted to the seal and configured to determine a condition of the seal;
wherein the sealing monitoring apparatus comprises: a temperature sensor mounted at the seal, a digital twin, the digital twin comprising seal wear characterization data and a seal temperature rise model, and a controller in communication with the temperature sensor, the controller configured to:
receive measured temperature data from the temperature sensor;
calculate expected temperature data for the seal by applying engine operating conditions to the digital twin; and
determine a condition of the seal based at least in part on a temperature difference of the measured temperature data from the expected temperature data;
wherein the controller and sensor are connected together by multiple lumens that are disposed in a cavity, the cavity extending through a guide vane of the engine and the multiple lumens arranged so as not to obstruct airflow through the engine;
wherein the multiple lumens comprise a first lumen that carries air and a second lumen that carries a wire;
upon detection of a failure condition of the seal, transmit a control signal to an aircraft flight controller that causes the aircraft flight controller to operate the engine in a restricted or reduced mode of operation.

17. The engine of claim 16 wherein the seal monitoring apparatus includes a temperature sensor embedded in the seal.

* * * * *